(12) United States Patent
Yang et al.

(10) Patent No.: US 7,609,342 B2
(45) Date of Patent: Oct. 27, 2009

(54) LIQUID CRYSTAL DISPLAY FOR ENHANCING REFLECTION AND METHOD OF MANUFACTURING THE SAME

(75) Inventors: Yong-Ho Yang, Seoul (KR); Joo-Sun Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/022,760

(22) Filed: Jan. 30, 2008

(65) Prior Publication Data
US 2008/0136988 A1 Jun. 12, 2008

Related U.S. Application Data

(62) Division of application No. 10/274,624, filed on Oct. 21, 2002, now Pat. No. 7,342,622.

(30) Foreign Application Priority Data

Oct. 22, 2001 (KR) ............... 10-2001-0065001
Sep. 17, 2002 (KR) ............... 10-2002-0056565

(51) Int. Cl.
*G02F 1/1335* (2006.01)
(52) U.S. Cl. ............... 349/113; 349/114
(58) Field of Classification Search ............ 349/114, 349/113
See application file for complete search history.

(56) References Cited

U.S. PATENT DOCUMENTS 6,233,031 B1 * 5/2001 Ishitaka ............... 349/113

6,894,747 B2 * 5/2005 Okumura ............... 349/113

FOREIGN PATENT DOCUMENTS

| JP | 10-325953 | 12/1998 |
|---|---|---|
| JP | 10-332914 | 12/1998 |
| JP | 200-105370 | 4/2000 |
| JP | 2000-162412 | 6/2000 |
| JP | 2001-154181 | 6/2001 |
| JP | 2001-228314 | 8/2001 |

* cited by examiner

*Primary Examiner*—David Nelms
*Assistant Examiner*—David Y Chung
(74) *Attorney, Agent, or Firm*—F. Chau & Assoc., LLC

(57) ABSTRACT

In an LCD for enhancing a reflection ratio, a second substrate faces the first substrate on which a pixel array is formed, a liquid crystal layer is interposed between the first and second substrates, an insulating layer on the first substrate includes first regions and second regions, where each of the second regions has a height difference relative to each of first regions, a base line of a first region forms an angle from about 5 to about 15 degrees with respect to a tangent line of a second region, an embossing pattern with a uniform and low stepped portion is formed by regulating an exposure amount applied to the organic insulating layer so that a reflection ratio is maximized and a distribution of the slopes of an embossing pattern is uniform, and the reflection ratio is enhanced in a specific direction by forming the embossing pattern with an asymmetric profile.

19 Claims, 23 Drawing Sheets

125 120 115 105 110 130 100

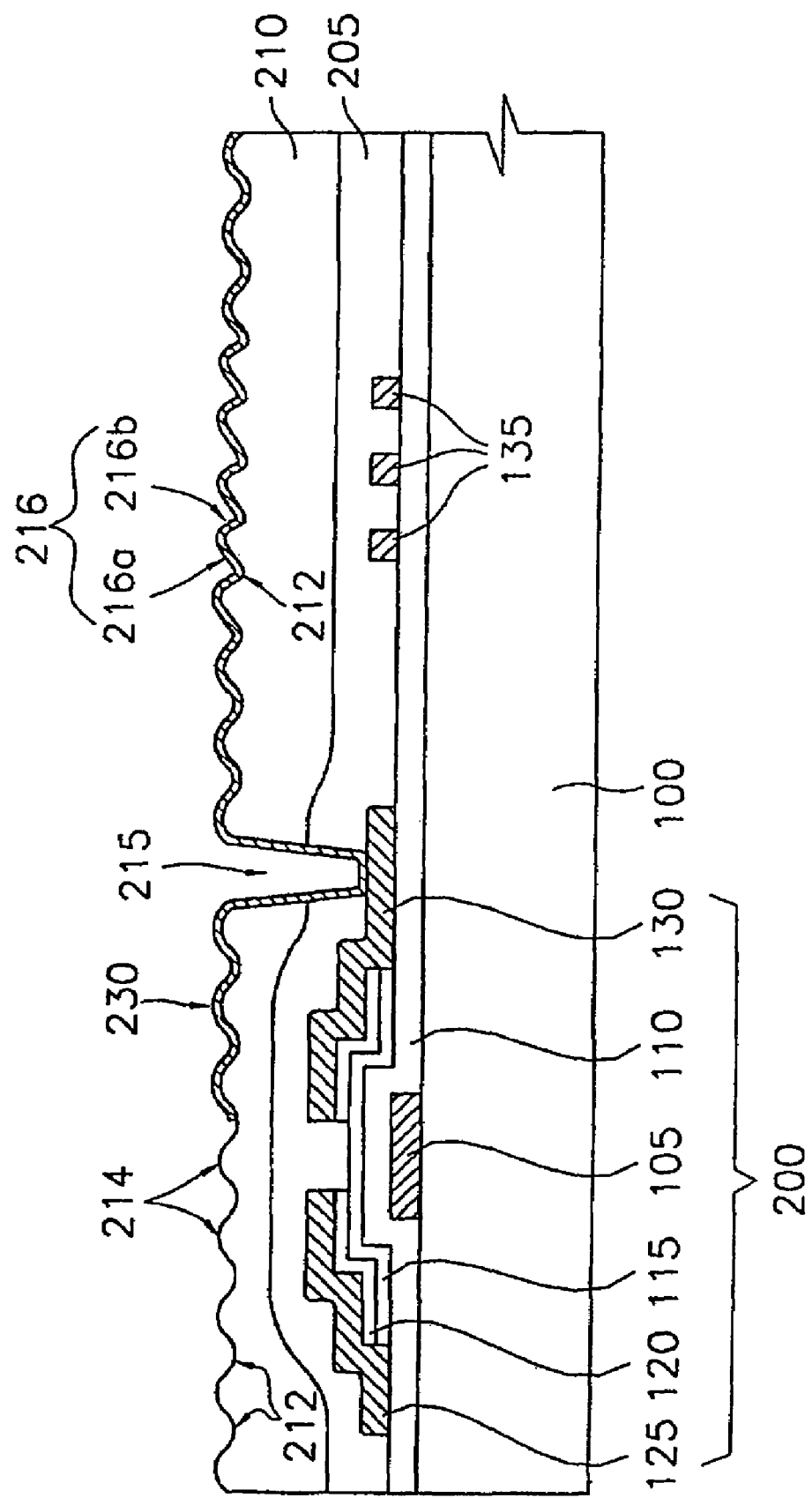

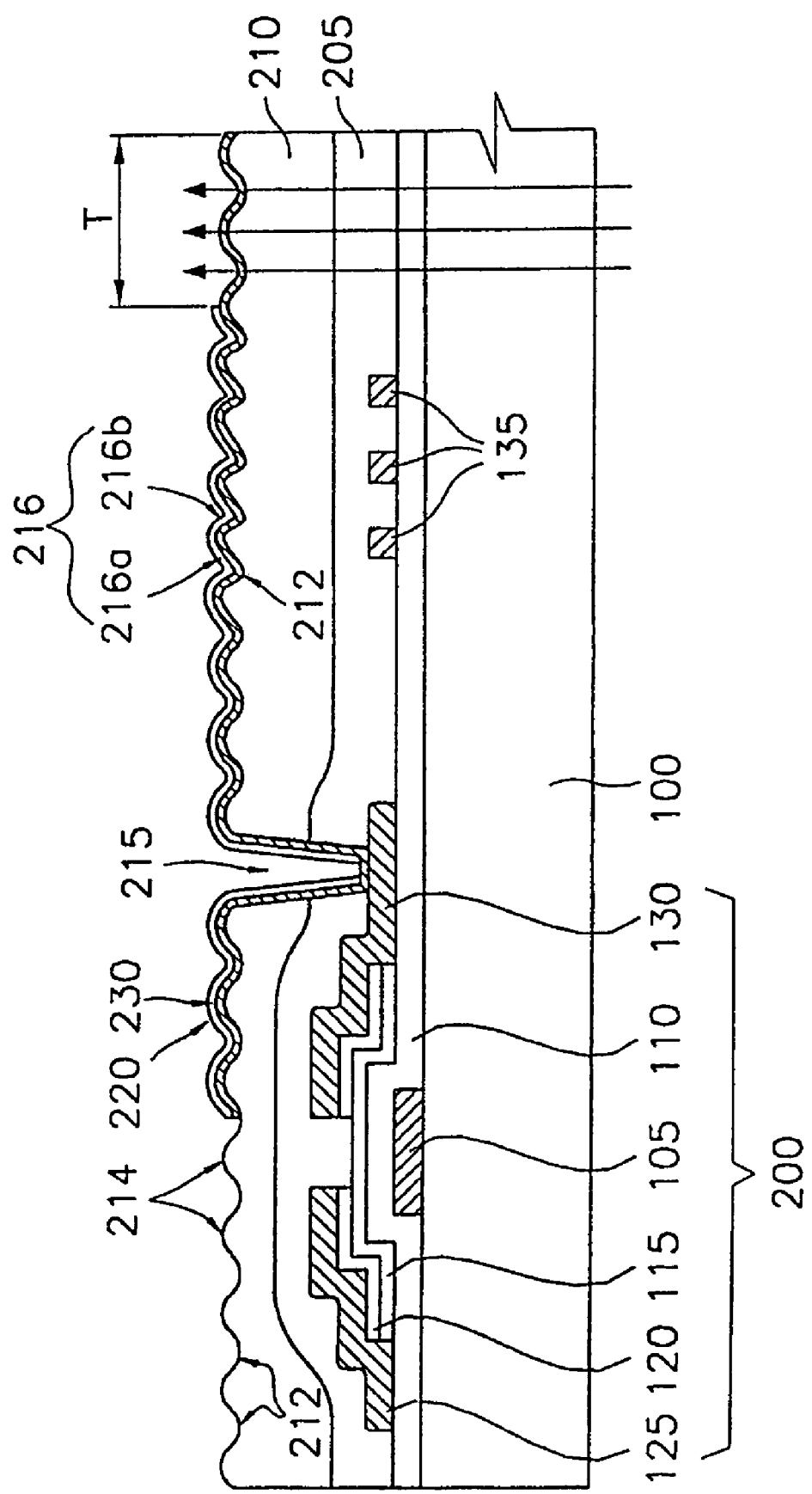

US 7,609,342 B2

LIQUID CRYSTAL DISPLAY FOR ENHANCING REFLECTION AND METHOD OF MANUFACTURING THE SAME

CROSS-REFERENCE TO RELATED APPLICATIONS

This application is a divisional of U.S. application Ser. No. 10/274,624 filed on Oct. 21, 2002, now U.S. Pat. No. 7,342, 622,which claims priority to Korean Patent Application Nos. 10-2001-65001 filed on Oct. 22, 2001 and 10-2002-56565 filed on Sep. 17, 2002, the disclosures of which are incorporated herein by reference in their entirety.

BACKGROUND OF THE INVENTION

1. Field of the Invention

The present invention relates to liquid crystal display ("LCD") technology, and more particularly, to an LCD having an enhanced reflection ratio and a method of manufacturing the same.

2. Description of the Related Art

Liquid crystal displays are classified into a transmissive type LCD, a reflective type LCD, and a reflective and transmissive type LCD. The transmissive type LCD displays an image using an external light source, and the reflective type LCD displays the image using an internal light source, such as, for example, a backlight. The reflective and transmissive type LCD operates in a transmissive mode to display images by means of built-in light sources while indoors or in a dark place where an external light source does not exist. The reflective and transmissive type LCD operates in a reflective mode to display images by reflecting a light incident from an external light source outdoors or in a place where a high illumination is provided.

A reflective type LCD has an advantage in that it consumes less power than a comparable transmissive type LCD because it uses the external light source, and the reflective type LCD is widely used in LCD devices having a small to medium scale screen. However, the reflective type LCD has a disadvantage in that it uses a smaller quantity of lights than the transmissive type LCD so as to display images and fails to provide a high display quality.

Technologies to enhance the reflection efficiency for the external light source have been developed to overcome some disadvantages of the reflective type LCD. These technologies are mainly classified into i) a method of using a reflection layer with a high reflection efficiency, ii) a method of forming a diffusion layer by means of beads on the upper substrate (e.g., color filter substrate), and iii) a method of forming an embossing pattern on a reflection electrode of a lower substrate (e.g., thin film transistor substrate) so that direct lights incident from the front are scattered intentionally to maximize the reflection efficiency. The technique using the embossing pattern is important for enhancing the display quality because the reflection ratio depends highly on a slope of an embossing profile in the embossing pattern.

First, an organic insulating layer is coated with a substrate on which a thin film transistor ("TFT") is formed so as to form an embossing pattern on a reflection electrode. The organic insulating layer is exposed and developed by means of a photo mask with a pattern. When the embossing pattern is formed on the organic insulating layer, the slope of an embossing profile in the embossing pattern can be regulated by an exposure amount irradiated onto a photosensitive organic insulating layer and by a successive heat treatment. However, when the technique using the embossing pattern is applied to an LCD with a large-scale screen, there may be non-uniformity of temperature distribution while curing the organic insulating layer, resulting in uneven or inferior heat treatment. Therefore, according to the conventional method in which the slope of the embossing profile is regulated by a condition of a heat treatment process, such as, for example, a hard-baking process for the organic insulating layer and a curing process, the uniformity of the slope of the embossing profile in the embossing pattern is reduced due to non-uniformity of the temperature distribution, thereby deteriorating display quality.

SUMMARY OF THE INVENTION

It is a first feature of the present invention to provide a liquid crystal display ("LCD") for enhancing the reflection ratio with a uniform characteristic of an LCD panel.

It is a second feature of the present invention to provide an LCD having an anisotropical reflection ratio according to a direction of an incident light.

It is a third feature of the present invention to provide a method of manufacturing an LCD for accurately regulating a slope of an embossing profile by regulating an exposure amount irradiated onto the organic insulating layer.

It is fourth feature of the present invention to provide a method of manufacturing an LCD having an anisotropic reflection ratio according to a direction of an incident light.

To achieve the first feature of the present invention, there is provided a liquid crystal display device comprising: a first substrate on which a pixel array is formed; a second substrate facing the first substrate; a liquid crystal layer between the first and second substrates; an insulating layer formed on the first substrate, a plurality of first regions and a plurality of second regions being formed on a surface of the insulating layer, each of the second regions having a height difference relative to each of the first regions, a base line of each of the first regions forming an angle from about 5 degrees to about 15 degrees with respect to a tangent line of each of the second regions; and a reflective electrode formed on the insulating layer, the reflective electrode having a same surface structure as in the insulating layer.

To achieve the second feature of the present invention, there is provided a liquid crystal display device comprising: a first substrate on which a pixel array is formed; a second substrate facing the first substrate; a liquid crystal layer between the first and second substrates; an insulating layer formed on the first substrate, a plurality of first regions and a plurality of second regions being formed on a surface of the insulating layer, each of the second regions having a height difference relative to each of the first regions, a base line of each of the first regions forming an angle from about 5 degrees to about 15 degrees with respect to a tangent line of each of the second regions; a reflective electrode formed on the insulating layer, the reflective electrode having a same surface structure as the insulating layer; and an embossing regulation pattern formed under the insulating layer, a profile of the second region being formed asymmetrically by the embossing regulation pattern facing the second region so as to increase a reflection ratio in a specific direction.

To achieve the third feature of the present invention, there is provided a method of fabricating a liquid crystal display device, the method comprising: forming a pixel array on a first substrate; forming an insulating layer on the first substrate; forming a plurality of first regions and a plurality of second regions on a surface of the insulating layer by exposing and developing the insulating layer so that each of the second regions has a height difference relative to each of the first regions, a base line of each of the first regions formed at an angle from about 5 degrees to about 15 degrees with respect to a tangent line of each of the second regions by regulating an exposure amount; forming a reflective electrode having a same surface structure as the insulating layer; forming a second substrate to face the first substrate; and forming a liquid crystal layer between the first and second substrates.

To achieve the fourth feature of the present invention, there is provided a method of fabricating a liquid crystal display device, the method comprising: forming a pixel array on a first substrate; forming an insulating layer on the first substrate; forming a plurality of first regions and a plurality of second regions at a surface of the insulating layer by exposing and developing the insulating layer so that each of the second regions has a height difference relative to each of the first regions, a base line of each of the first regions formed at an angle from about 5 degrees to about 15 degrees with respect to a tangent line of each of the second regions by regulating an exposure amount; forming a reflective electrode having a same surface structure as the insulating layer; forming a second substrate to face the first substrate; forming a liquid crystal layer between the first and second substrates; and forming an asymmetric profile on a surface of the second region before forming the insulating layer by forming an embossing regulation pattern facing the second region so as to increase a reflection ratio in a specific direction.

To achieve the fourth feature of the present invention, there is also provided a method of fabricating a liquid crystal display device, the method comprising: forming a pixel array on a first substrate; forming an insulating layer on the first substrate; forming a plurality of first regions and a plurality of second regions on a surface of the insulating layer by exposing and developing the insulating layer by means of a slit mask so that each of the second regions has a height difference relative to each of the first regions, and that each of the second regions has an asymmetric profile; forming a reflective electrode having a same surface structure as the insulating layer; forming a second substrate to face the first substrate; and forming a liquid crystal layer between the first and second substrates.

In accordance with embodiments of the present invention, an inclination angle of the embossing pattern of an organic insulating layer is formed to be about 5 to about 15 degrees, preferably 8 to about 11 degrees by regulating an exposure amount applying the organic insulating layer so that a reflection ratio can be maximized and a distribution of the slopes of an embossing pattern can be uniform.

According to one embodiment of the present invention, an embossing regulation pattern of metal is formed under the organic insulating layer so that a portion of the embossing pattern over the embossing regulation pattern has an asymmetric profile.

According to another embodiment of the present invention, a portion of the embossing profile to have a gentle slope is put through a slit exposure process, and a portion of the embossing profile to have a steep slope is put through a normal exposure process, so that an embossing pattern with an asymmetric profile is formed.

Therefore, the reflection ratio is enhanced and the angular field is guaranteed in a specific direction by forming the embossing pattern with an asymmetric profile due to an anisotropic reflection ratio.

BRIEF DESCRIPTION OF THE DRAWINGS

The above features and other advantages of the present invention will become more apparent by describing preferred embodiments thereof in detail with reference to the attached drawings, in which:

FIGS. 15A and 15B are sectional views illustrating a method of fabricating the reflective and transmissive type LCD in accordance with a fifth embodiment of the present invention.

DETAILED DESCRIPTION OF PREFERRED EMBODIMENTS

A liquid crystal display for enhancing reflection and method of manufacturing the same are disclosed in accordance with preferred embodiments of the present invention. Several exemplary embodiments will be described in detail with reference to the accompanying drawings.

The exposure equipment used in lithography processes has become highly accurate in correspondence with the development of semiconductor techniques. Accordingly, the slope of the embossing profile is dependent upon heats by regulating the exposure amount irradiated onto an organic insulating layer by means of the exposure equipment in a process of forming an embossing pattern, so that uniformity of the embossing pattern is enhanced.

Generally, the organic insulating layer is formed through the following process: First, a photosensitive organic insulating layer made of an acrylic resin is coated onto an insulating substrate on which a plurality of pixels, each having a thin film transistor, is formed. Then, a soft-bake process is performed on the photosensitive organic insulating layer so as to evaporate solvent at a low temperature near the glass transition temperature. The organic insulating layer is exposed by applying ultraviolet ("UV") rays onto a photo mask for the organic insulating layer, and contact holes exposing a portion of each pixel are formed by exposing the organic insulating layer using a tetramethyl-ammonium hydroxide ("TMAH") developer. Simultaneously, embossing patterns for scattering lights are formed on a surface of the organic insulating layer.

Next, the organic insulating layer is hard-baked in order to accomplish reflow of the organic insulating layer, outgassing and solvent removal. Then, the organic insulating layer is cured at a temperature of more than about 200 degrees Celsius for more than about 1 hour so as to harden and stabilize the organic insulating layer. The curing step strengthens the effect of the hard-baking.

Figure 1A:
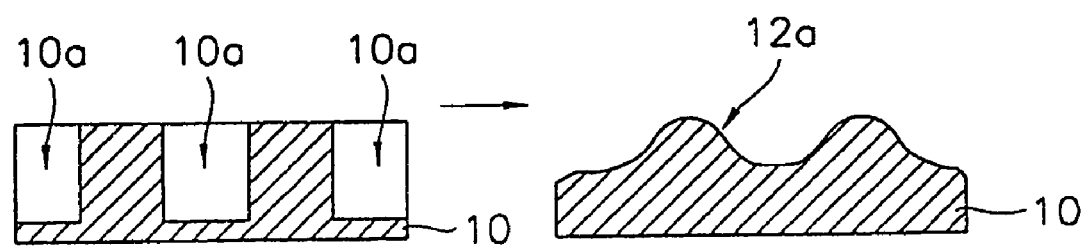
FIGS. 1A to 1C are sectional views illustrating a variation of an embossing profile of an organic insulating layer according to an exposure amount irradiated onto the organic insulating layer.
Figure 1B:
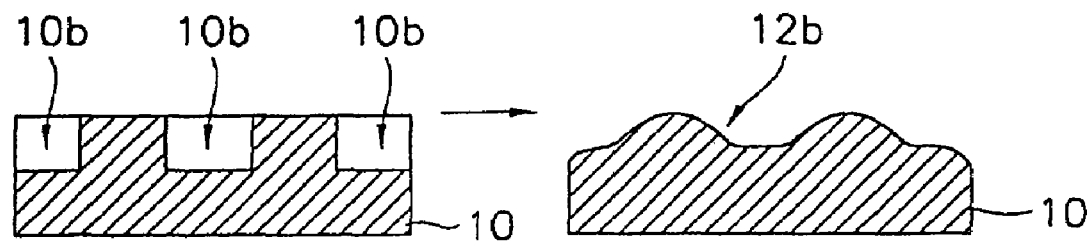
Figure 1C:
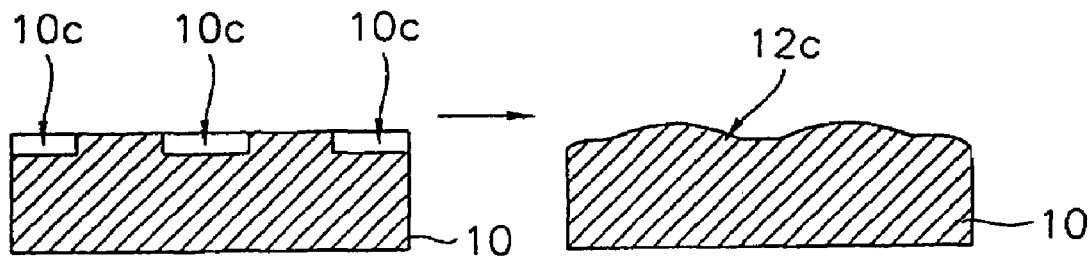

FIGS. 1A to 1C are sectional views illustrating a variation of an embossing profile of an organic insulating layer according to an exposure amount irradiated onto the organic insulating layer, wherein the exposure amount decreases from FIG. 1A to FIG. 1C. As shown in FIG. 1A to FIG. 1C, the slope of the embossing profile formed on the organic insulating layer 10 is enlarged when the exposure amount irradiated onto the organic insulating layer increases. However, the slope of the embossing profile decreases and the distribution of the slopes of the embossing profile in the embossing patterns is uniformly formed when the exposure amount irradiated onto the organic insulating layer decreases.

In a conventional process, after increasing the exposure amount irradiated onto the organic insulating layer to enlarge the slope of the embossing profile, a hard-baking process and a curing process are continuously carried out at 200 degrees Celsius for 1 hour in a furnace or oven, which causes reflow of the organic insulating layer to thereby regulate the slope of the embossing profile. A temperature difference of each glass substrate is large enough to make a non-uniform amount of reflow. Accordingly, the distribution of the slopes of the embossing profile in the embossing patterns is not uniformly formed.

However, according to an embodiment of the present invention, the slope of the embossing profile is decreased by reducing the exposure amount by about 30 to about 40% of the conventional exposure amount, a hard-baking process is performed at about 100 to about 120 degrees Celsius for about 3 minutes, and then a curing process is performed at about 230 degrees Celsius for about 100 minutes. The temperature of the hard-baking process is increased slowly to a curing temperature for about 60 minutes, the curing temperature is maintained for about 40 minutes so as to perform the curing process. Generally, the amount of reflow increases when the temperature of the hard-baking process is increased quickly, and the amount of reflow reduces when the temperature of the hard-baking process is increased slowly. When the amount of reflow of the organic insulating layer increases, the surface of the organic insulating layer becomes flat, so that the embossing pattern can be removed. Accordingly, the amount of the reflow can be reduced and the embossing profile can be maintained through the curing process after slowly increasing the temperature of the hard-baking.

According to an embodiment of the present invention, the slope of the embossing profile is determined by regulating the exposure amount irradiated onto the organic insulating layer, and the amount of reflow is reduced in the hard-baking and curing process, so that the heat dependency can be minimized in comparison with the conventional method in which the slope of the embossing profile is regulated by a heat treatment process for curing the organic insulating layer. The non-uniform distribution of the slopes of the embossing profile is generated by the non-uniform amount of the reflow due to a non-uniform temperature distribution. Therefore, according to the present invention, the non-uniform distribution of the slopes of the embossing profile can be prevented.

The reference numerals 10a, 10b and 10c represent the exposed areas of the organic insulating layer, and the reference numerals 12a, 12b and 12c represent the slopes of the embossing profile.

Figure 2:
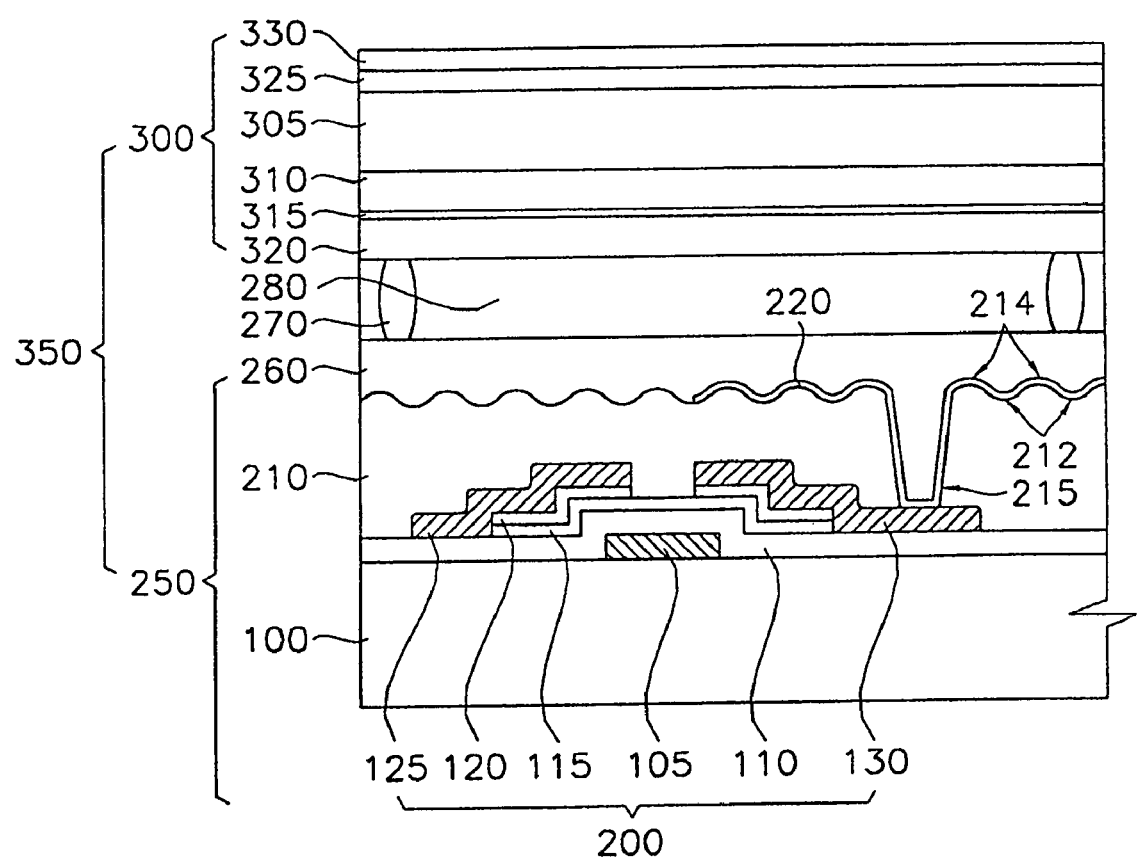
FIG. 2 is a sectional view of a reflective type LCD in accordance with a first embodiment of the present invention.

FIG. 2 is a sectional view of a reflective type LCD in accordance with a first embodiment of the present invention. Referring to FIG. 2, the reflective type LCD includes an LCD panel 350 for displaying images and a driving integrated circuit (not shown) for generating an image signal.

The LCD panel 350 includes a first substrate 250, a second substrate 300 disposed to face the first substrate 250, a liquid crystal layer 280 interposed between the first substrate 250 and the second substrate 300, and a pixel electrode such as a reflective electrode 220, which is formed between the first substrate 250 and the liquid crystal layer 280.

The first substrate 250 includes a first insulating substrate 100 and a thin film transistor ("TFT") 200 as a switching device formed on the first insulating substrate 100. The TFT 200 includes a gate electrode 105, a gate insulating film 110, an active pattern 115, an ohmic contact layer 120, a source electrode 125 and a drain electrode 130. The gate electrode 105 is formed branched from a gate line (not shown) that is elongated in a first direction on the first insulating substrate 100.

The gate insulating film 110 is formed on the entire surface of the first insulating film 100 on which the gate electrode 105 is formed. On a portion of the gate insulating film 110 over the gate electrode 105 are formed sequentially the active pattern 115 of amorphous silicon and the ohmic contact layer 120 of $n^+$ amorphous silicon. The active pattern 115 can be comprised of polycrystalline silicon. The first embodiment is applied to an LCD with a bottom-gate structure, but the first embodiment can be applied to an LCD with a top-gate structure.

The source electrode 125 and the drain electrode 130 are formed on the ohmic contact layer 120 and the gate insulating film 110. The gate electrode 105 is disposed between the source electrode 125 and the drain electrode 130, thereby completing the TFT 200.

On the first insulating substrate 100 on which the TFT 200 is formed, there is deposited an inorganic insulating film (not shown) and an organic insulating layer 210 sequentially as a passivation layer. The inorganic insulating film guarantees the reliability of the TFT and pads and enhances a bonding strength of a Chip On Glass ("COG") bonding. The organic insulating layer 210 is formed only on a display region. A contact hole 215 is formed through the inorganic and organic insulating film, to expose a portion of the drain electrode 130 or a source electrode 125.

The organic insulating layer 210 has an embossing pattern including a plurality of first regions 212 and a plurality of second regions 214 formed in such a manner that the first regions 212 have a recess shape lower in height relative to the second regions 214 and the second regions 214 have a protrusion shape higher in height relative to the first regions 212. Also, a contact hole 215 is formed on the organic insulating layer 210, to expose a portion of the drain electrode 130 or a source electrode 125.

Figure 3:
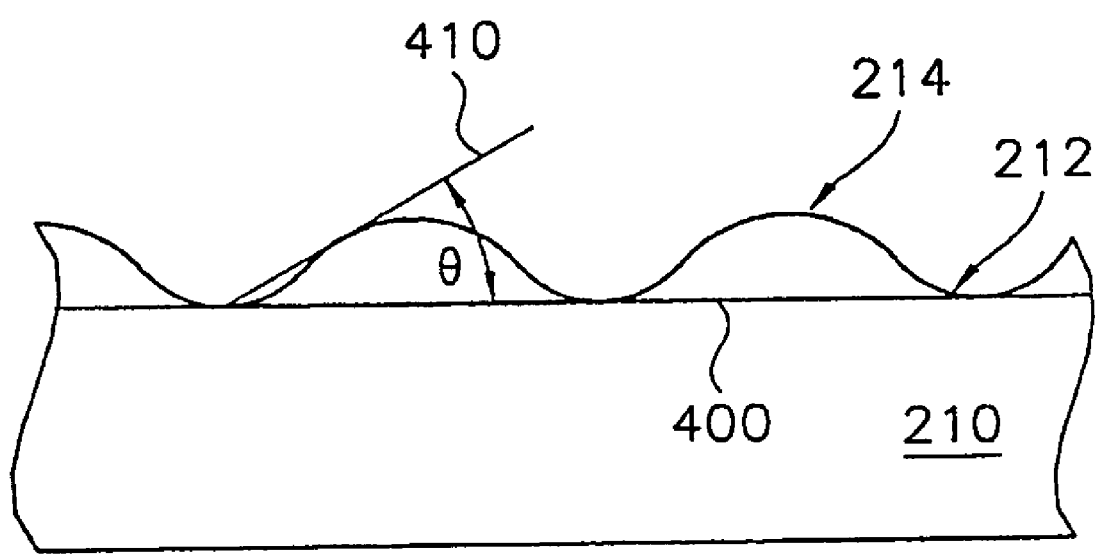
FIG. 3 is an enlarged view of an embossing pattern of FIG. 2.

FIG. 3 is an enlarged view of an embossing pattern of FIG. 2. Referring to FIG. 3, the embossing pattern of the organic insulating layer 210 is formed so that a tangent line of the second region 214 forms an angle ("θ") of inclination from about 5 to about 15 degrees, preferably from about 8 to about 11 degrees with respect to a bottom side 400 of the first region 212. Specifically, the base line 400 of the first region 212 is defined to be parallel to the first insulting substrate 100, so that the angle between the base line 400 and the tangent line 410 to the surface profile of the second region 214 becomes the angle (θ) of inclination, i.e., the slope (θ) of the embossing profile. When the slope (θ) is from about 5 to about 15 degrees, the reflection ratio becomes maximum, and an embossing pattern with a uniform and low stepped portion is formed.

The reflective electrode 220 is formed as a pixel electrode on the contact hole 215 and the organic insulating layer 210, where the reflective electrode 220 conforms to the surface shape or structure of the organic insulating layer 210. The reflective electrode 220 is comprised of aluminum ("Al") or silver ("Ag") with a high reflective ratio, and is connected to the drain electrode 130 through the contact hole 215. The reflective electrode 220 has a plurality of first regions 212, which are a plurality of grooves, and a plurality of second regions 214, which are a plurality of protruded portions, functioning as micro lenses in correspondence with the surface with the embossing pattern of the organic insulating layer 210.

A first orientation film 260 is formed on the reflective electrode 220. The second substrate 300 facing the first substrate 250 includes a second insulating substrate 305, a color filter 310 having red, green and blue ("RGB") pixels to display color, a transparent common electrode 315 and a second orientation film 320.

The second insulating substrate 305 is comprised of glass or ceramic material, which is the same material as the first insulating substrate 100. The color filter 310 is disposed below the second insulating substrate 305, and the common electrode 315 and the second orientation film 320 are formed sequentially below the color filter 310. The second orientation film 320 pre-tilts liquid crystal molecules of the liquid crystal layer 280 together with the first orientation film 260 of the first substrate 250.

Seal lines 270 having a spacer shape are interposed between the first substrate 250 and the second substrate 300 to thus form a certain space between the first substrate 250 and the second substrate 30. The liquid crystal layer 280 is filled in the space, thereby completing a reflective type LCD.

The gate electrode 105 of the TFT 200 is connected to a gate line elongated in a first direction, the source electrode 125 is connected to a data line (not shown) elongated in a second direction perpendicular to the first direction, and the drain electrode 130 is connected to the reflective electrode 220. Accordingly, when a scan voltage is applied to the gate electrode 105 through the gate line, a data signal on the data line is applied from the source electrode 125 to the drain electrode 130 through the active pattern 115. When the data signal is applied to the drain electrode 130, there is a voltage difference between the reflective electrode 220 connected to the drain electrode 130 and the common electrode 315 of the second substrate 300. The molecular array of the liquid crystal layer 280 interposed between the pixel electrode 220 and the common electrode 315 is changed, and the light transmissivity of the liquid crystal layer is changed. Accordingly, the TFT 200 functions as a switching device for operating the pixels of the LCD panel 350.

Figure 4A:
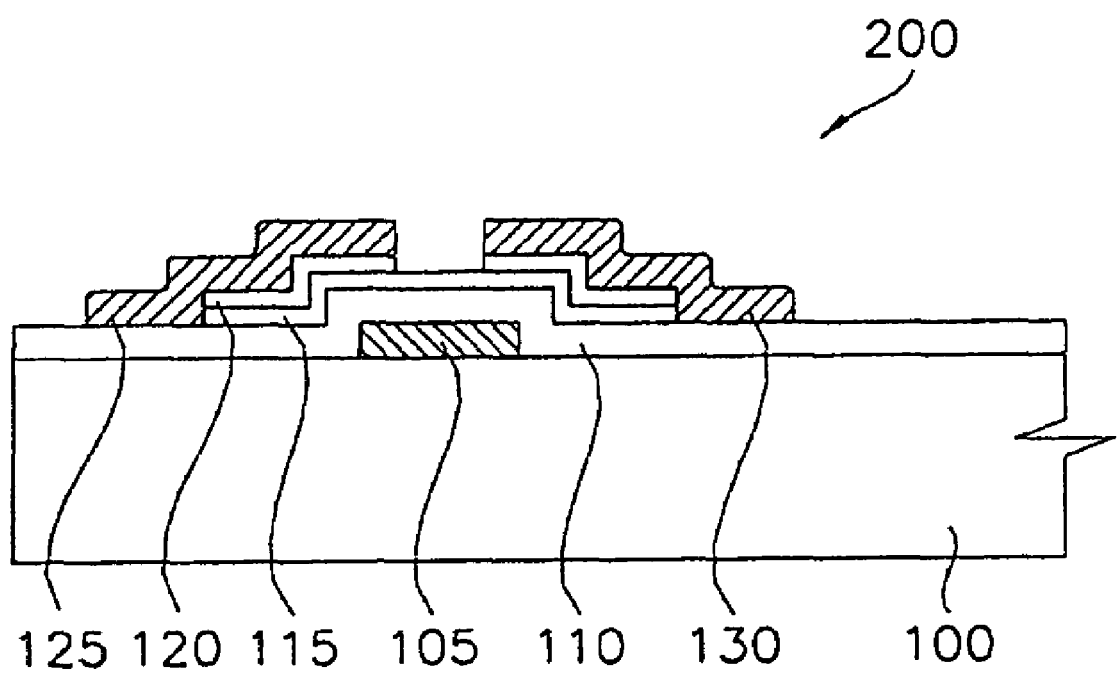
FIGS. 4A to 4E are sectional views illustrating a method of fabricating the reflective type LCD of FIG. 2.

FIGS. 4A to 4E are sectional views illustrating a method of fabricating the reflective type LCD of FIG. 2. Referring to FIG. 4A, on a first insulating substrate 100 of glass or ceramic is deposited a first metal layer made of such as about 500 angstroms ("Å") thickness chrome ("Cr") and about 2500 Å thickness aluminum-neodymium ("Al—Nd"). Thereafter, the deposited metal layer is patterned through a photolithography process to form a gate wiring having a gate line (not shown) elongated in a first direction, a gate electrode 105 branched from the gate line and a gate pad (not shown). The gate pad is connected to an end of the gate line, receives an external signal, and transmits the received signal to the gate line. Preferably, the gate electrode 105 has sidewalls having tapered profiles.

Afterwards, an about 4500 Å thickness silicon nitride film is deposited on the entire surface of the first insulating substrate 100 including the gate wiring by a Plasma Enhanced Chemical Vapor Deposition ("PECVD") method, and thus a gate insulating film 110 is formed.

An about 2000 Å thickness amorphous silicon film is formed on the gate insulating film 110 by the PECVD method, and $n^+$ doped amorphous silicon film is deposited thereon in a thickness of about 500 Å by the PECVD method. Amorphous silicon film and $n^+$ doped amorphous silicon film are deposited in-situ in the same PECVD equipment. Thereafter, the amorphous silicon film and in-situ deposited $n^+$ amorphous silicon film are patterned through a photolithography process to sequentially form an active pattern 115 of amorphous silicon film and an ohmic contact layer 120 of $n^+$ doped amorphous silicon film on the gate insulating film 110, on which the gate electrode 105 is placed.

Subsequently, on the first insulating substrate 100 on which resultant substances are formed is deposited a second metal layer of metal such as, for example, chromium ("Cr"), chromium-aluminum ("Cr—Al") or chromium-aluminum-chromium ("Cr—Al—Cr") in a thickness of about 1500 to about 4000 Å by a sputtering method. Then, the second metal layer is patterned to form data wiring including a data line (not shown) elongated in a second direction perpendicular to the gate line, a source electrode 125 branched from the data line, a drain electrode 130, and a data pad that is connected to an end of the data line and transmits image signals on the data line. Thus, a thin film transistor 200 including the gate electrode 105, the gate insulating layer 110, the active pattern 115, the ohmic contact layer 120, the source electrode 125 and the drain electrode 130 is completed. The gate insulating film 110 is interposed between the gate line and the data line, thereby preventing the gate line from contacting the data line.

A portion of ohmic contact layer 120 between the source electrode 125 and the drain electrode 130 is removed by a Reactive Ion Etching ("RIE") method. The portion of the active pattern 115 between the source electrode 125 and the drain electrode 130 becomes a channel region of the TFT 200.

According to the first embodiment, five masks are used to manufacture a bottom-gate TFT LCD because two masks are used to form the active pattern 115, the ohmic contact layer 120 and the data wiring. However, the present Applicant has filed a patent application resulting in issuance of U.S. Pat. No. 6,255,130, filed Nov. 19, 1998 and incorporated by reference herein in its entirety, in which four masks are used to manufacture the bottom-gate TFT LCD by using only one mask to form the active pattern 115, the ohmic contact layer 120 and the data wiring.

Hereinafter, a method of manufacturing the TFT LCD by the four mask method is described in detail. First, an active layer, an ohmic contact layer and a second metal layer are deposited sequentially on a gate insulating layer 110. A photoresist film is coated on the second metal layer, and a photoresist pattern (not shown) is formed by exposing and developing the photoresist film. The photoresist pattern includes a first portion that is disposed over a channel region of a TFT and has a first thickness, a second portion that is disposed over data wiring and has a second thickness thicker than the first thickness, and a third portion from which the photoresist film is removed. Then, the data wiring of the second metal layer, an ohmic contact layer 120 of $n^+$ doped amorphous silicon film, and an active pattern 115 of amorphous silicon film are formed simultaneously by etching the second metal film under the third portion, the ohmic contact layer, the active layer, the second metal film under the first portion and a partial thickness of the second portion. The rest of the photoresist pattern is removed. Accordingly, the active pattern 115, the ohmic contact layer 120, and the data wiring having the source electrode 125 and the drain electrode 130 formed simultaneously by using a mask.

Figure 4B:
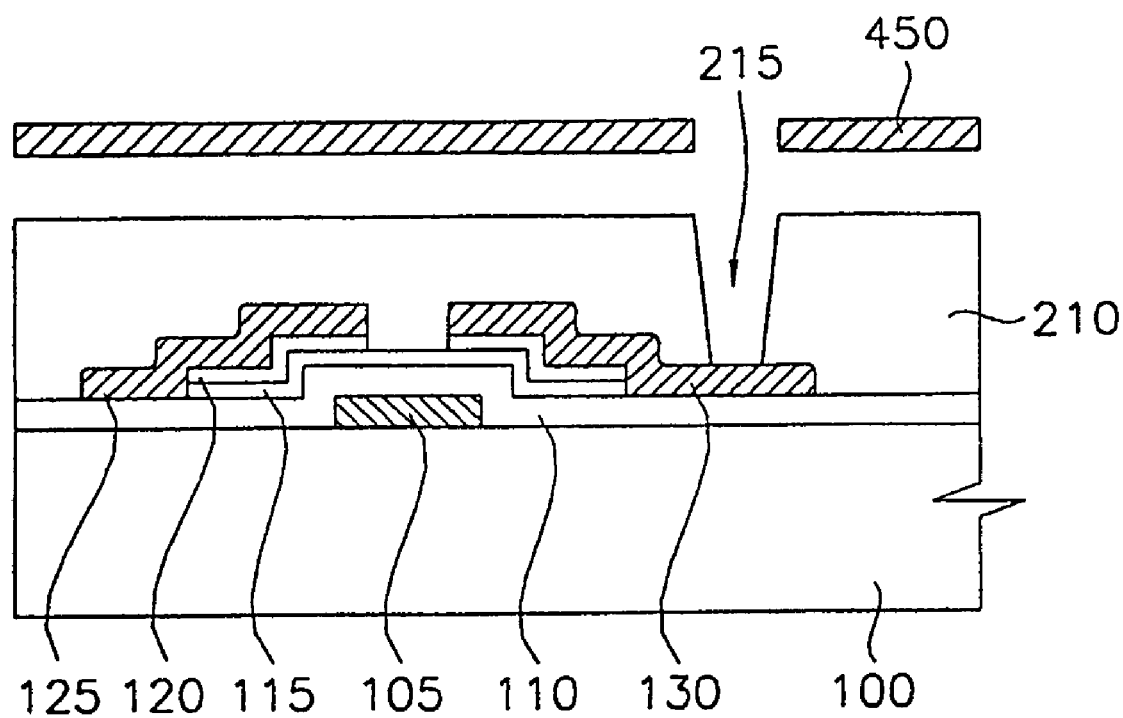

Referring to FIG. 4B, a transparent inorganic insulating film (not shown) made of such as silicon nitride, for example, is formed as a passivation layer on the entire surface of the first insulating substrate 100 on which the TFT 200 is formed. A first contact hole is formed by etching the inorganic insulating film and the gate insulating layer 110 so as to partially expose the drain electrode 130. A photosensitive organic insulating layer 210 made of such as acrylic resin, for example, is coated in a thickness of about 3 to about 5 μm on the first contact hole and the inorganic insulating film by a spin coating method or by a slit coating method.

Figure 4C:
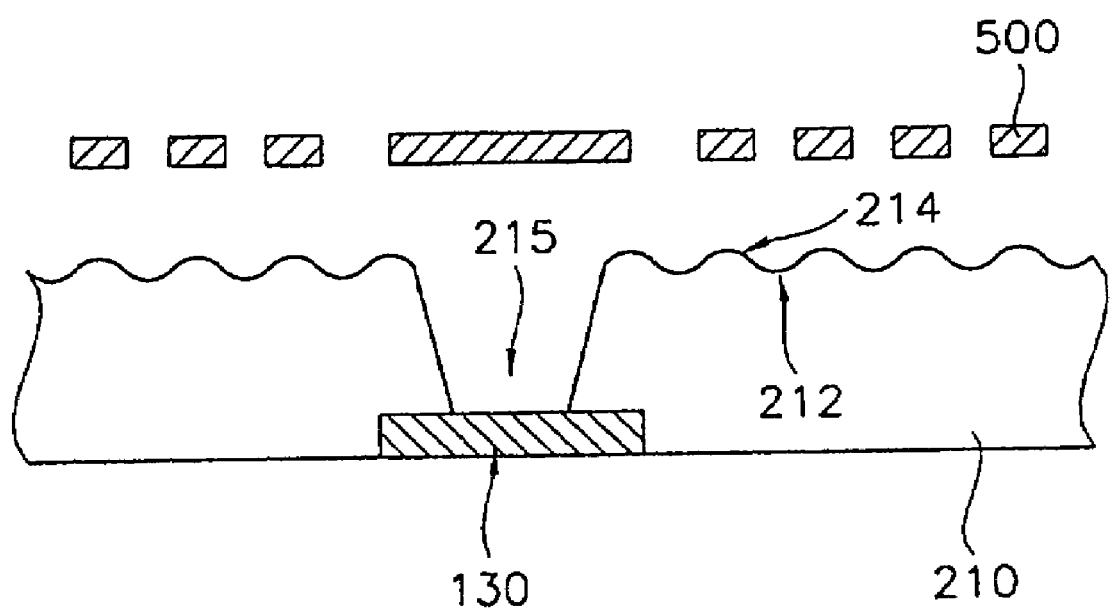

Then, a soft-baking process is performed near the glass transition temperature, which is—from about 100 to about 120 degrees Celsius, such as, for example, 90 degrees Celsius, for about 3 minutes so as to remove solvent. On the organic insulating layer 210 are formed the contact hole 215 and a plurality of grooves and protruded portions through a UV exposure process and a development process. A process of forming the contact hole 215 and the plurality of grooves and protruded portions at the organic insulating layer 210 are described in detail as follows: Referring to FIG. 4C, a first photo mask 450 is aligned over the organic insulating layer 210 so as to form the contact hole 215. The first mask 450 has a pattern corresponding to the contact hole 215. Afterwards, the organic insulating layer 210 is subject to a first full exposure process to thereby expose a portion of the organic insulating layer 210 over the source electrode 125 or drain electrode 130.

Next, to form the plurality of grooves and protruded portions, a second photo mask 500 having a pattern corresponding to the plurality of grooves and protruded portions, and for forming micro lenses, is aligned over the organic insulating layer 210. Then, a lens exposure process using the second photo mask 500 is performed to an exposure amount of 2000 ms, to thereby secondly expose the organic insulating layer 210 except the contact hole 215.

A developing process is performed to thereby form a contact hole 215 exposing the portion of the drain electrode 130 and an embossing pattern having a plurality of first regions 212 and second regions 214 on a surface of the organic insulating layer 210.

When applying an exposure amount of 2000 ms to the exposure process, the embossing pattern has slopes (θ) of about 5 to about 15 degrees, preferably about 8 to about 11 degrees, to thereby obtain a maximum reflection ratio. Also, the embossing pattern has a uniform and low stepped portion because a depth of a hollow of the embossing pattern is small due to the difference in height between the first region 212 and the second region 214. Accordingly, a step deviation of the embossing pattern becomes small to thereby maintain a uniform cell gap. In addition, an orientation force can be maintained uniformly due to the small stepped portion, and spots on the injection port of the liquid crystal can be prevented because the liquid crystal injected along the hollow of the embossing pattern decreases due to the small depth of hollow of the embossing pattern.

After the developing process is completed, the organic insulating layer 210 is hard-baked in a furnace or oven at a temperature of about 100 to about 120 degrees Celsius for about 3 minutes in order to accomplish reflow of the organic insulating layer 210, outgassing and solvent removal. Next, the temperature is increased slowly to 230 degrees Celsius for about 60 minutes and then, maintained at about 230 degrees Celsius for about 40 minutes. Under this condition, a curing process is carried out so as to harden and stabilize the organic insulating layer 210. The final thickness of the organic insulating layer 210 is about 2 to about 3 μm.

Figure 4D:
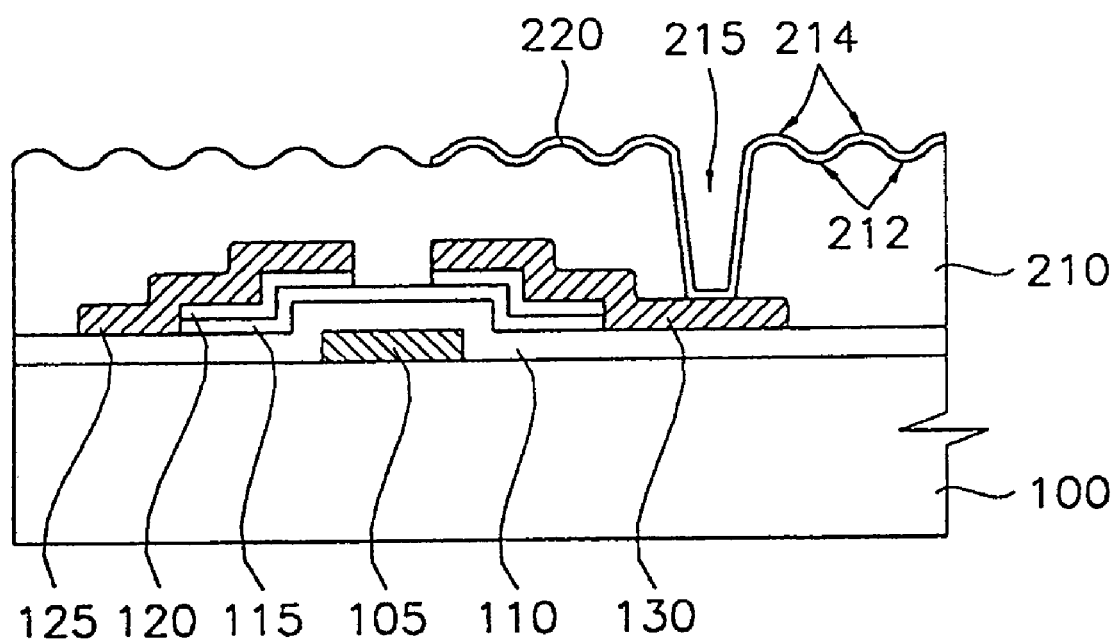

Referring to FIG. 4D, the gate insulating film 110 is put through a dry-etching process so as to form the contact holes to expose a gate pad and a data pad in a pad region. Afterwards, a third metal layer made of metal with a high reflection ratio, such as aluminum ("Al") or silver ("Ag"), is deposited on the organic insulating layer 210 and the contact hole 215. The third metal layer is patterned through a photolithography process to form a reflective electrode 220 used as a pixel electrode. The reflective electrode 220 is connected to the drain electrode 130 of the TFT 200 through the contact hole 215. A photoresist is coated on the reflective electrode 220, and a first orientation film 260 is formed through a rubbing process. The first orientation film 260 pre-tilts liquid crystal molecules of the liquid crystal layer 280 at a predetermined angle.

The reflective electrode 220 has the same shape as the surface of the organic insulating layer 210. The reflective electrode 220 has a plurality of first regions or grooves 212 and a plurality of second regions or protruded portions 214 functioning as micro lenses in correspondence with the surface and the embossing pattern of the organic insulating layer 210.

Figure 4E:
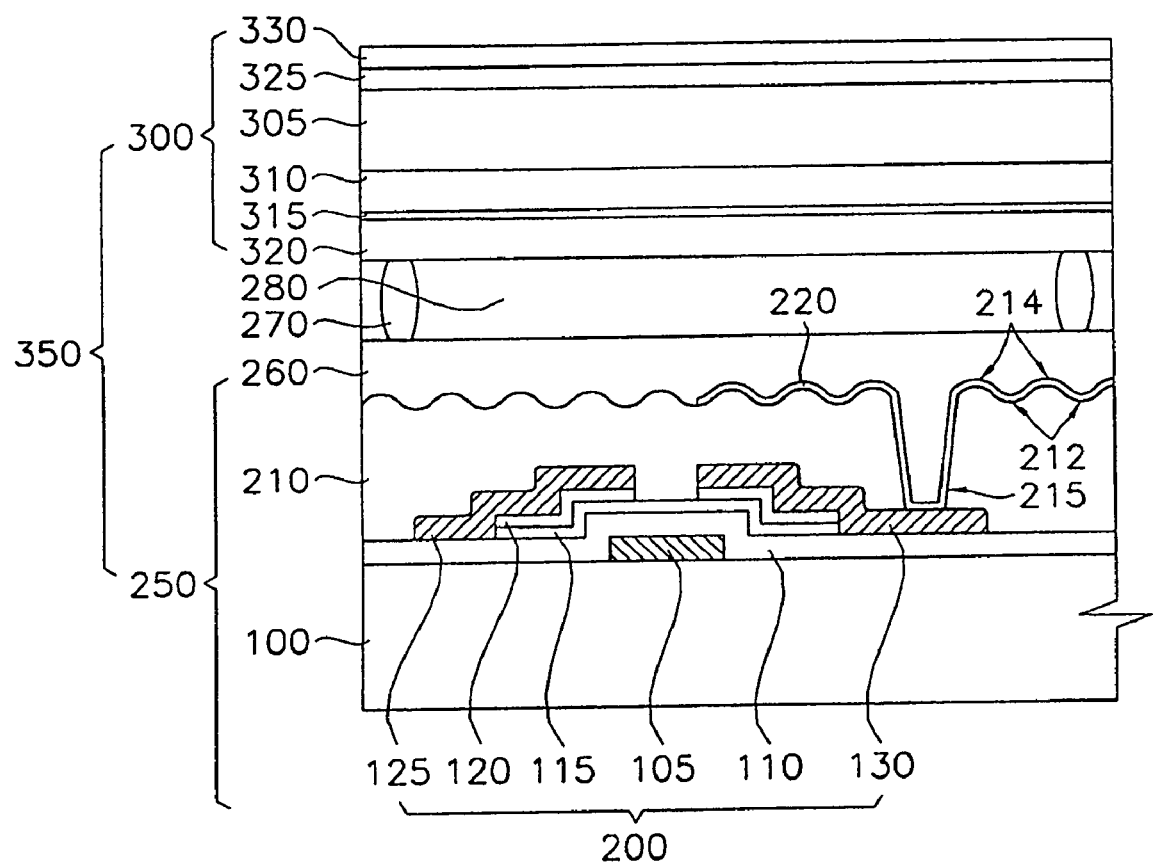

Referring to FIG. 4E, a color filter 310, a common electrode 315 and a second orientation film 320 are formed sequentially on the second insulating substrate 305, which is comprised of the same material as the first insulating substrate 100, thereby completing a second substrate 300. The second substrate 300 is disposed to face the first substrate 250. Seal lines 270 of a spacer shape are interposed between the first substrate 250 and the second substrate 300 to thus form a certain space between the first substrate 250 and the second substrate 300. The liquid crystal layer 280 is filled in the space by a vacuum injection method, thereby completing a reflective type LCD according to a first exemplary embodiment of the present invention. A polarizing plate 330 and a phase difference plate 325 can be attached on the front surface of the second substrate 300. Although not shown in the drawings, a black matrix can be arranged between the second insulating substrate 305 and the color filter 310.

Figure 5:
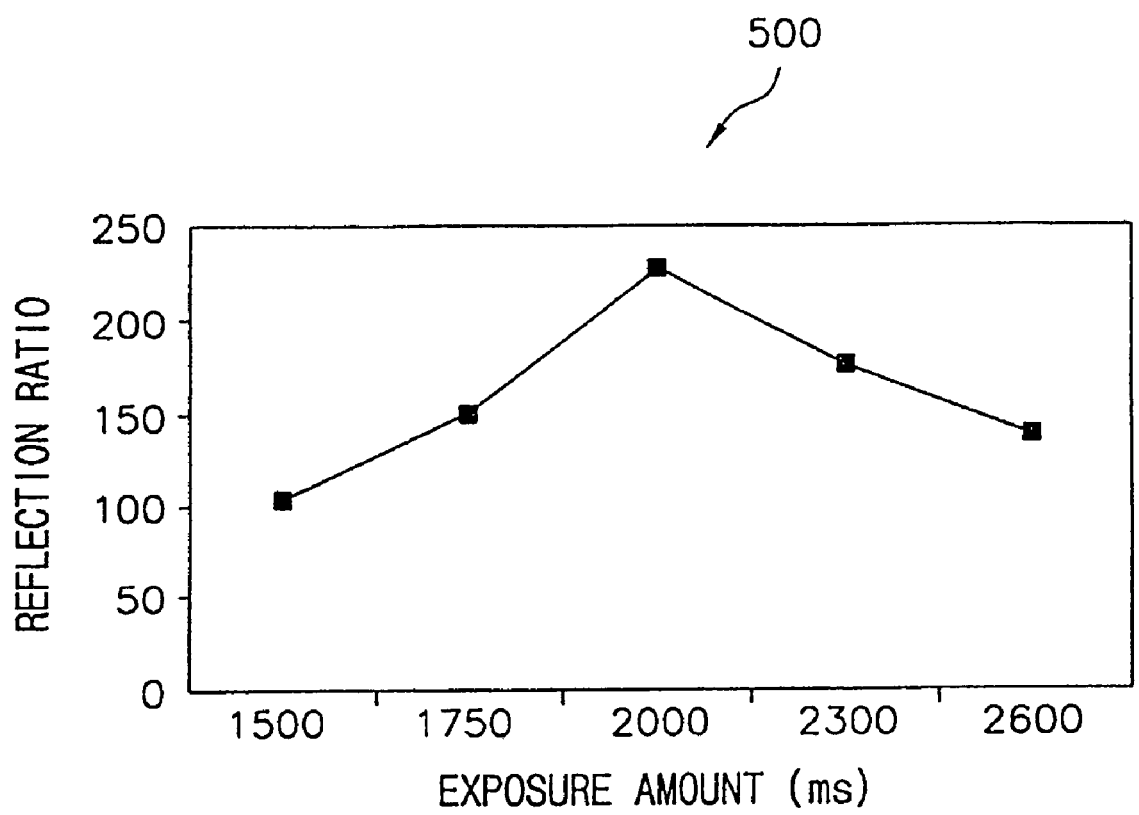
FIG. 5 is a graph showing a variation of a reflection ratio of the organic insulating layer according to an exposure amount irradiated onto the organic insulating layer.
Figure 6:
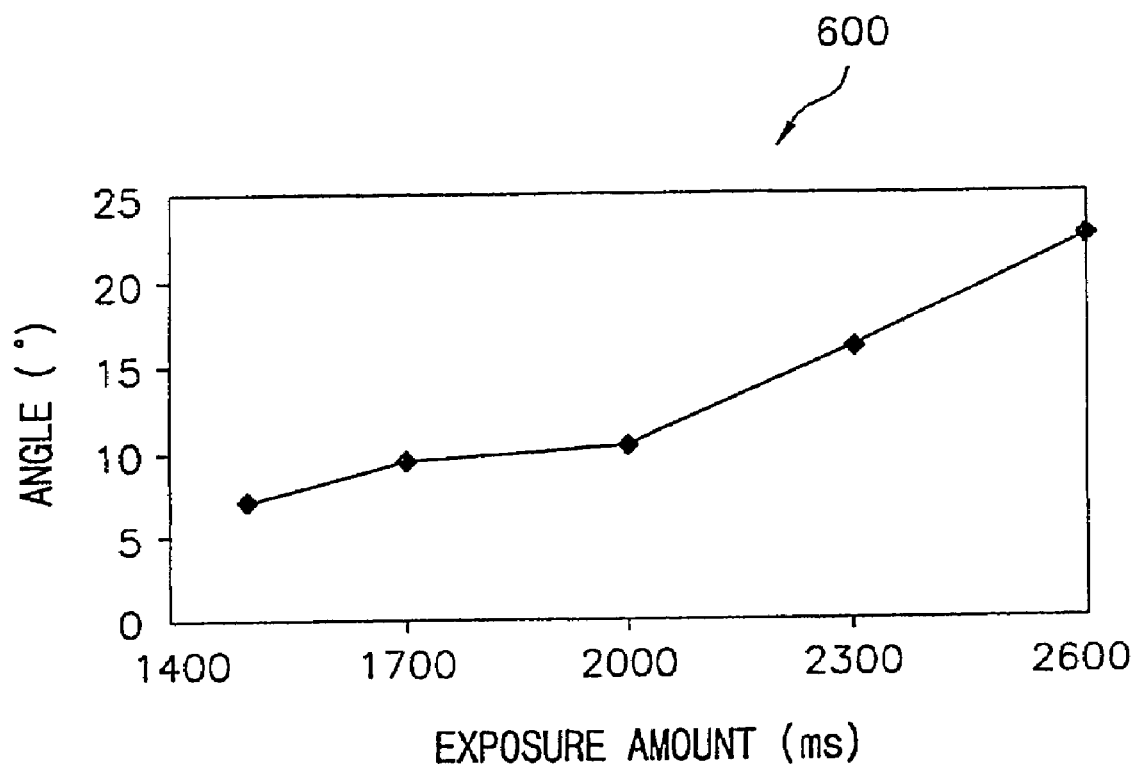
FIG. 6 is a graph showing a variation of a slope of an embossing profile of an organic insulating layer according to an exposure amount irradiated onto the organic insulating layer.

In FIG. 5, a graph showing a variation of a reflection ratio of the organic insulating layer according to an exposure amount irradiated onto the organic insulating layer is indicated generally by the reference numeral 500. In FIG. 6, a graph showing a variation of a slope of an embossing profile of an organic insulating layer according to an exposure amount irradiated onto the organic insulating layer is indicated generally by the reference numeral 600.

Referring to FIG. 5 and FIG. 6, a slope of the embossing profile forms a slope (θ) of about 8 to about 11 degrees when the exposure amount irradiated onto the organic insulating layer 210 is about 2000 ms, and a reflection ratio greater than about 200 is obtained at the slope. However, a slope of the embossing profile becomes less than about 5 degrees when the exposure amount irradiated onto the organic insulating layer 210 decreases below about 2000 ms, and the reflection ratio decrease.

Figure 7:
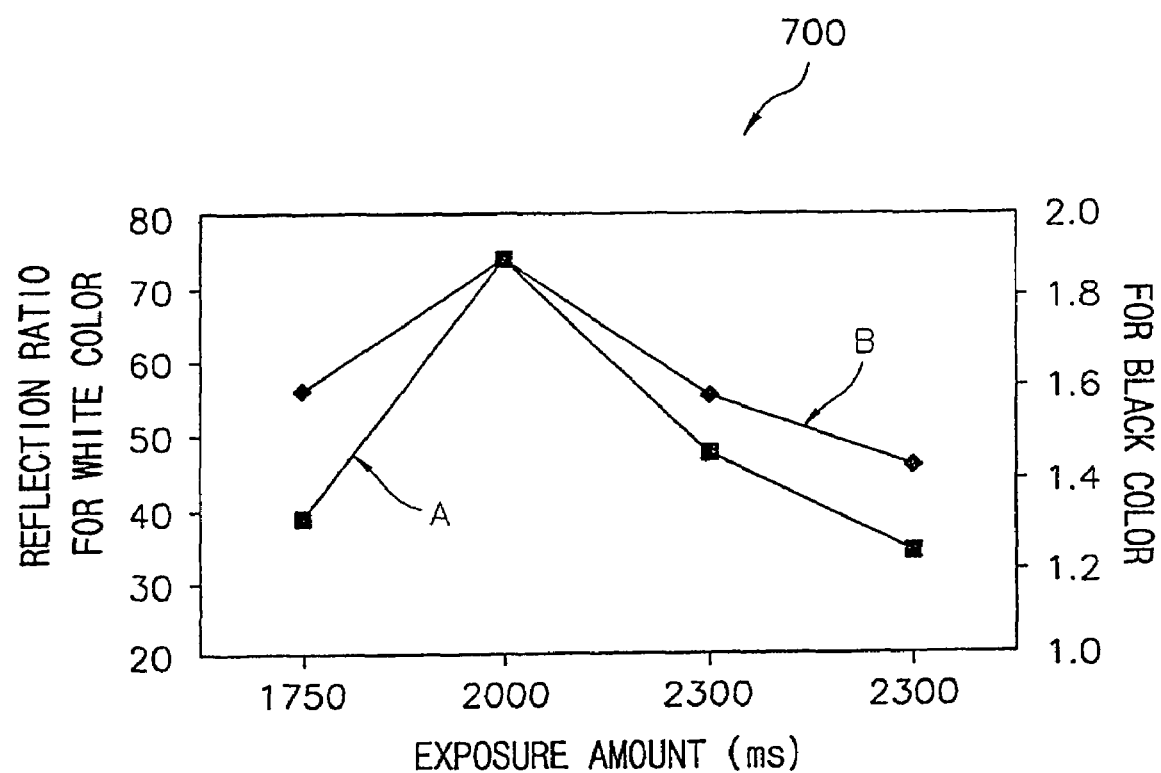
FIG. 7 is a graph showing a variation of white and black color reflection ratios of the organic insulating layer according to an exposure amount irradiated onto the organic insulating layer.
Figure 8:
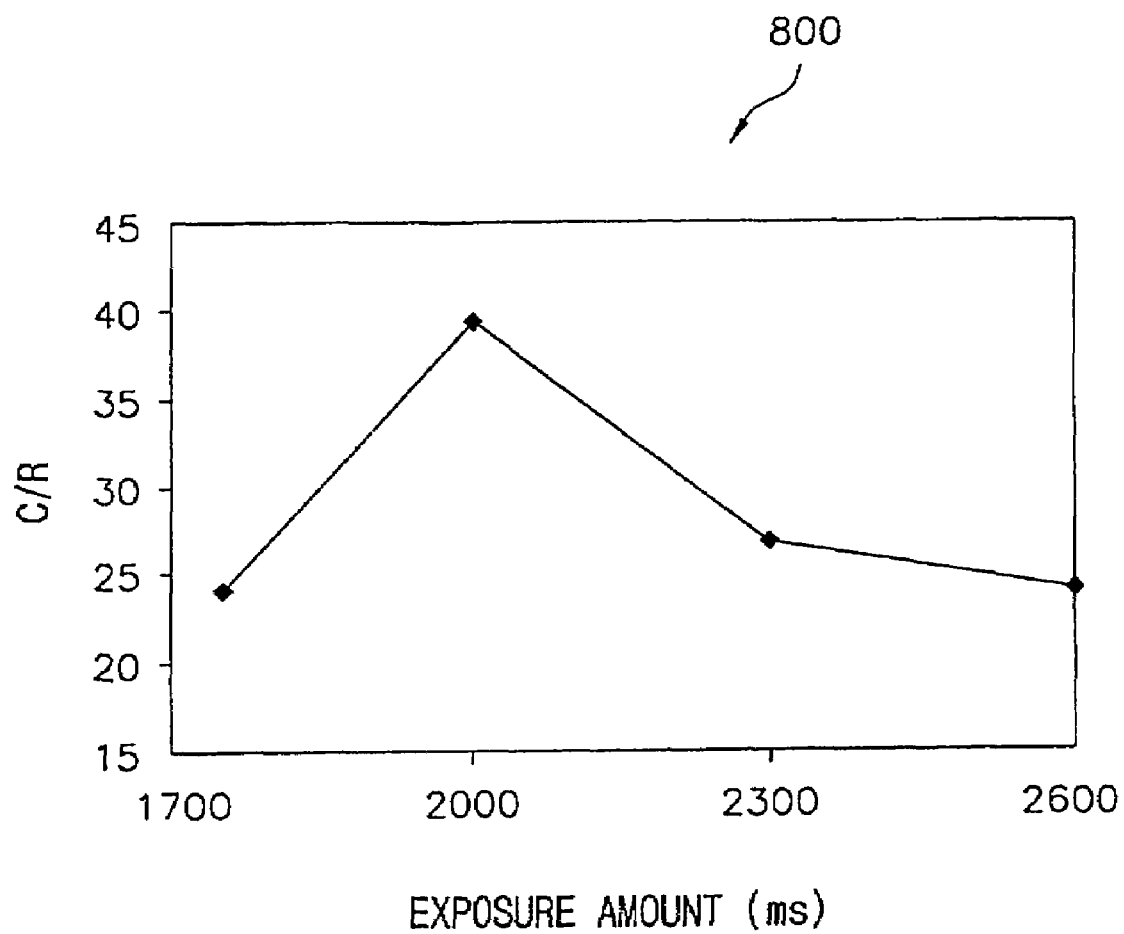
FIG. 8 is a graph showing a variation of a contrast ratio of an organic insulating layer according to an exposure amount irradiated onto the organic insulating layer.

In FIG. 7, a graph showing a variation of white and black color reflection ratios of the organic insulating layer according to an exposure amount irradiated onto the organic insulating layer is indicated generally by the reference numeral 700. In FIG. 8, a graph showing a variation of a contrast ratio of an organic insulating layer according to an exposure amount irradiated onto the organic insulating layer is indicated generally by the reference numeral 800. As shown in FIG. 7, 'A' represents a reflection ratio of a white color, and 'B' represents a reflection ratio of a black color.

Referring to FIG. 7 and FIG. 8, each reflection ratio of the white and black colors has a maximum value when the exposure amount is about 2000 ms. The reflection ratio of the black color increases because the reflection ratio of the white color is enhanced as the exposure amount decreases down to about 2000 ms, and the LCD has a high contrast ratio ("C/R") of more than about 30.

Figure 9:
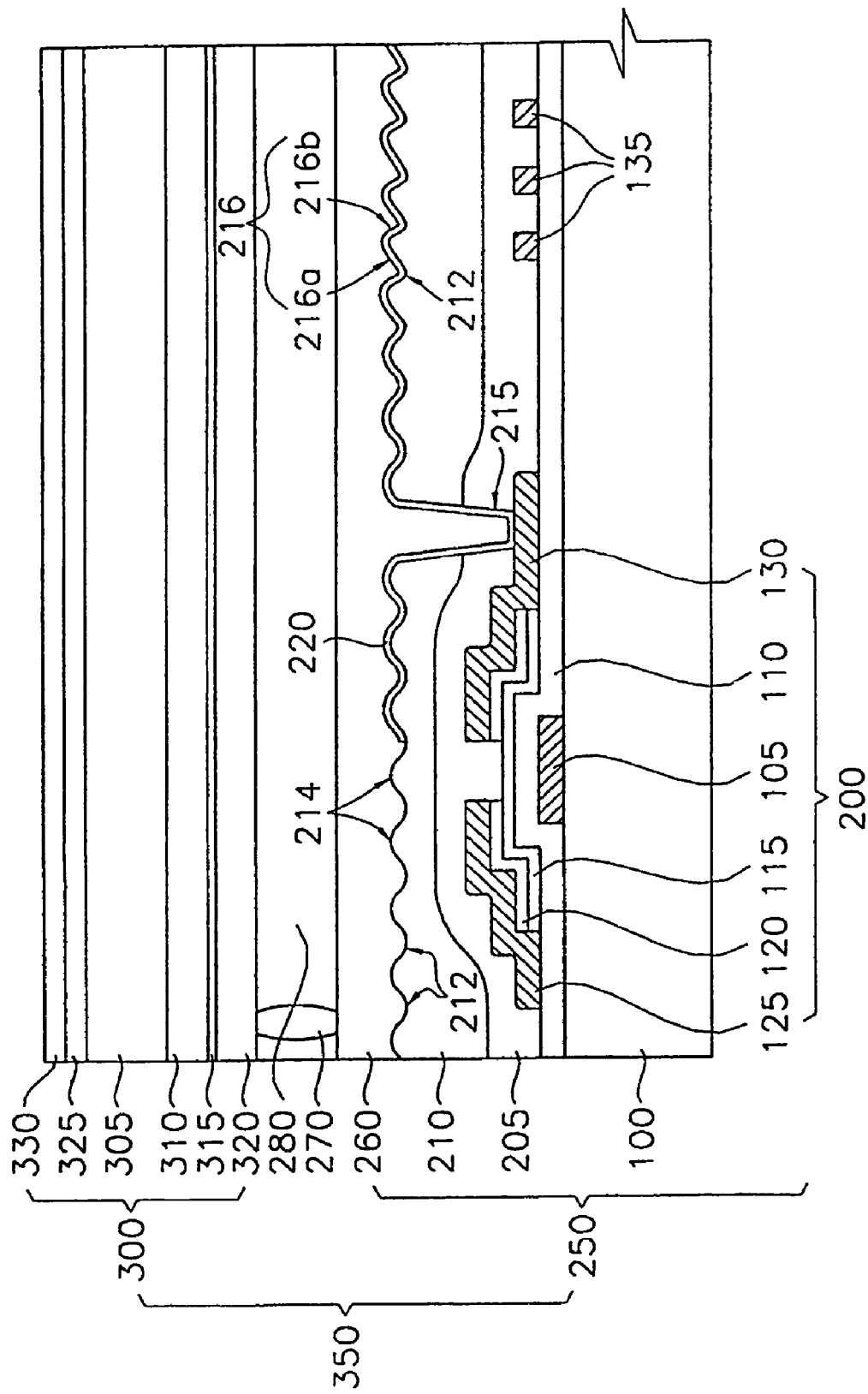
FIG. 9 is a sectional view of a reflective type LCD in accordance with a second embodiment of the present invention.

FIG. 9 is a sectional view of a reflective type LCD in accordance with a second embodiment of the present invention. The same elements as those of FIG. 2 are designated by the same reference numerals.

Referring to FIG. 9, the first substrate 250 includes a first insulating substrate 100, gate lines (not shown) and data lines (not shown) formed to be perpendicular with each other on the first insulating substrate 100, and a thin film transistor ("TFT") 200 as a switching device formed on a pixel defined by a gate line and a data line. The TFT 200 includes a gate electrode 105, a gate insulating film 110, an active pattern 115, an ohmic contact layer 120, a source electrode 125 and a drain electrode 130. The second embodiment is applied to an LCD with a bottom-gate structure, but the second embodiment can be applied to an LCD with a top-gate structure.

At least one embossing regulation pattern 135 is formed in a shape of an island on the gate insulating film 110. The embossing regulation pattern 135 is comprised of the same metal layer as the data line including the source 125 and drain 130 electrodes. The embossing regulation pattern 135 enhances the exposure effect during an exposure process for forming an embossing pattern on the organic insulating layer 210, to be formed over the embossing regulation pattern 135. One portion of an embossing that is disposed over the embossing regulation pattern 135 has a gentle embossing profile 216a, and the other portion of an embossing disposed over the embossing regulation pattern 135 has a steep embossing profile 216b, to thereby have an asymmetric embossing profile.

A transparent inorganic insulating film 205 and an organic insulating layer 210 are deposited sequentially as a passivation layer on the first insulating substrate 100, on which the TFT 200 and the embossing regulation pattern 135 are formed. Preferably, the inorganic insulating layer 205 is formed as a single layer of SiOx, SiNx or SiOxNx, or as a double layer of SiOx and SiNx. A contact hole 215 is formed through the inorganic insulating film 205 and the organic insulating layer 210 to expose a portion of the drain electrode 130 or a source electrode 125.

Figure 11:
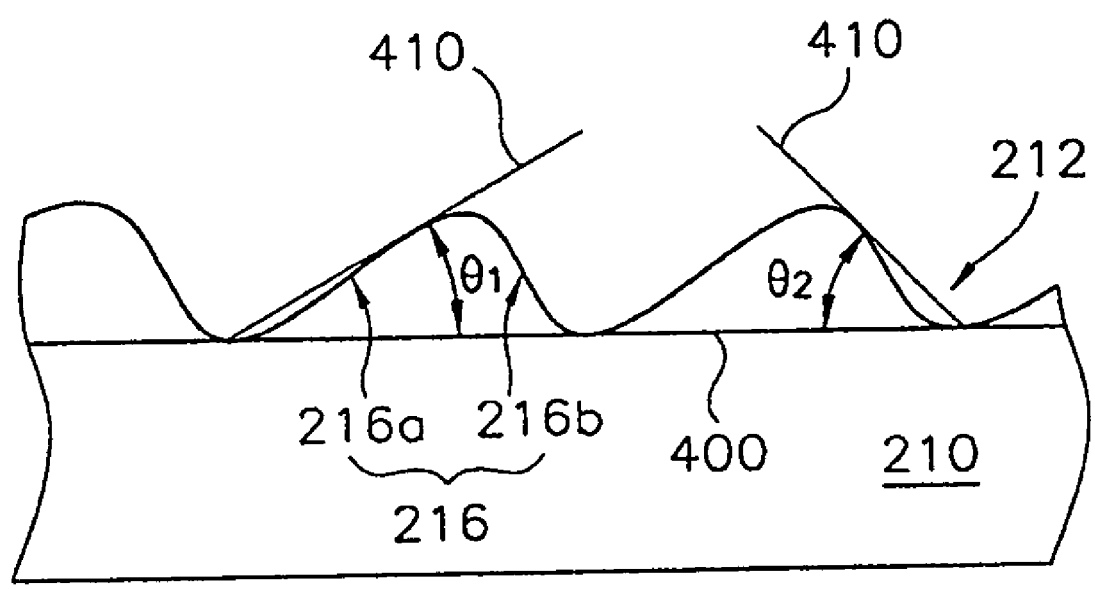
FIG. 11 is an enlarged sectional view of the embossing pattern of FIG. 9.

The organic insulating layer 210 has an embossing pattern including a plurality of first regions or grooves 212 and a plurality of second regions or protruded portions 214, 216 formed in such a manner that the first regions 212 have a recess shape lower in height relative to the second regions 214, 216, and the second regions 214, 216 have a protrusion shape higher in height relative to the first regions 212. As shown in FIG. 11, the second regions 216 disposed over the embossing regulation pattern 135 have an asymmetric profile.

Figure 10:
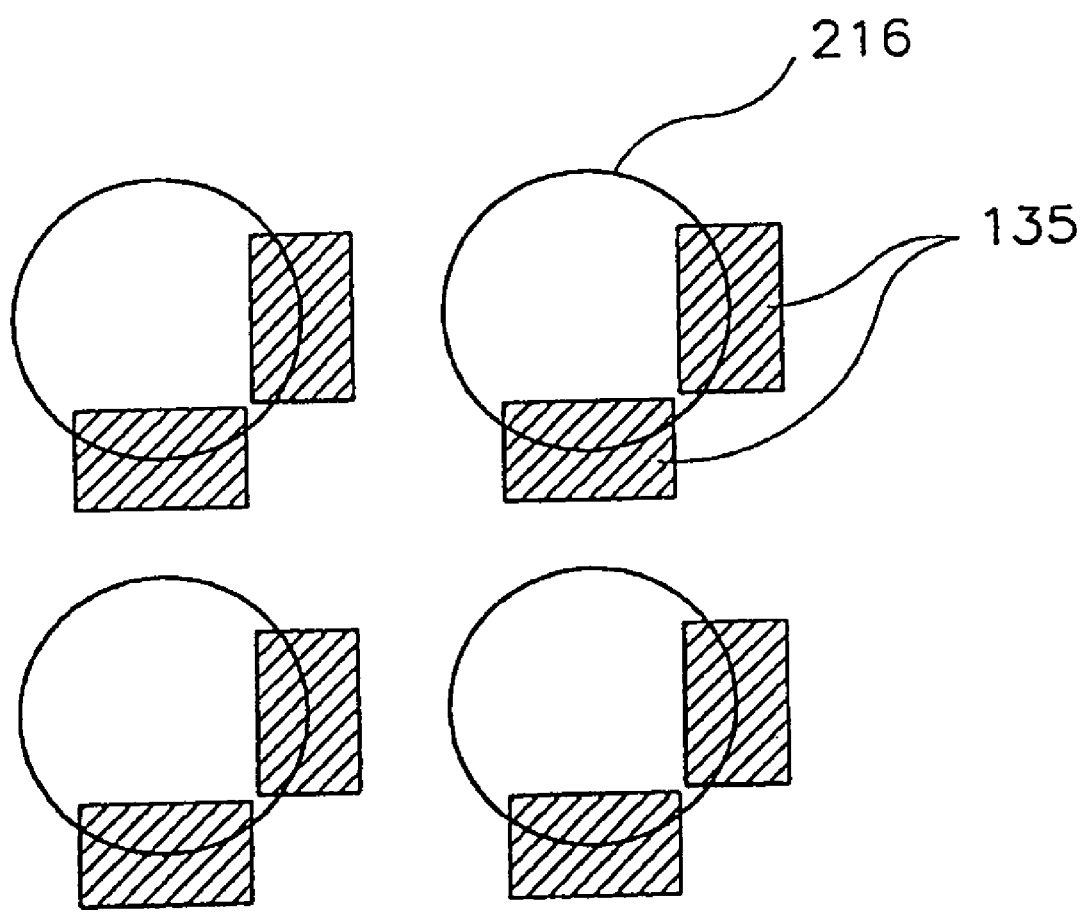
FIG. 10 is a plane view of the embossing pattern of FIG. 9.

FIG. 10 is a plane view of the embossing pattern of FIG. 9, and FIG. 11 is an enlarged sectional view of the embossing pattern of FIG. 9. Referring to FIG. 10 and FIG. 11, a transparent inorganic insulating layer 205 made of silicon nitride, for example, is formed under the organic insulating layer 210. When a pattern for reflecting lights is formed under the organic insulating layer 210, the portion of the organic insulating layer 210 over the pattern is more affected during the exposure process for forming an embossing pattern on the organic insulating layer 210 than other portions of the organic insulating layer 210. In other words, when a pattern of reflection layer such as metal exists under the organic insulating layer 210, the exposure effect is enhanced by about 10 to about 20% in comparison with when only the transparent inorganic insulating layer 205 exists under the organic insulating layer 210. An exposure amount depends upon the reflection ratio of the pattern. Therefore, according to the second embodiment of the present invention, the embossing regulation pattern 135 comprised of the same metal layer as the source 125 or drain 130 electrodes is formed under the organic insulating layer 210, so that a profile of one portion of the second region 216 over the embossing regulation pattern 135 is formed to have a slope ($\theta_1$) by which a reflection ratio is maximized and a profile of the other portion of the second region 216 over the embossing regulation pattern 135 is formed to a slope ($\theta_2$) by which a reflection ratio is minimized.

Preferably, a first tangent line of more than about 10 percent of the second regions 216 forms a slope from about 8 degrees to about 11 degrees with respect to the base line of the first region 212, and a second tangent line of more than about 10 percent of the second regions 216 forms a slope of more than about 11 degrees with respect to the base line of the first region 212.

In addition, an embossing regulation pattern 135 is formed under both a portion of the first region 212 and a portion of the second region 216, so that the second region 216 has an asymmetric embossing profile. Specifically, a portion of the second region 216 under which the embossing regulation pattern 135 is formed has an embossing profile with a first slope and the other portion of the second region 216 under which the embossing regulation pattern 135 is not formed has an embossing profile with a second slope smaller than the first slope.

The second regions 214 over the source 125 or drain 130 electrodes have a symmetric embossing profile because each second region 214 is formed over metal layer such as a source electrode 125 or drain electrode 130). When a portion of the second region 216 is disposed over an end of the source 125 or drain 130 electrodes, the portion of the second region 216 has an embossing profile with a steep slope.

A reflection electrode 220 is formed on the contact hole 215 and the organic insulating layer 210. The reflection electrode 220 is comprised of material with a high reflection ratio such as Al or Ag, and is connected to the drain electrode 130 through the contact hole 215. The reflective electrode 220 has a plurality of first regions or grooves 212 and a plurality of second regions or protruded portions 214, 216 functioning as micro lenses in correspondence with the surface and the embossing pattern of the organic insulating layer 210.

A first orientation film 260 is formed on the reflection electrode 220. The second substrate 300 facing the first substrate 250 includes a second insulating substrate 305, a color filter 310 having RGB pixels to display color, a transparent common electrode 315 and a second orientation film 320.

Seal lines 270 of a spacer shape are interposed between the first substrate 250 and the second substrate 300 to thus form a certain space between the first substrate 250 and the second substrate 30. The liquid crystal layer 280 is filled in the space, thereby completing a reflective type LCD.

Figure 12A:
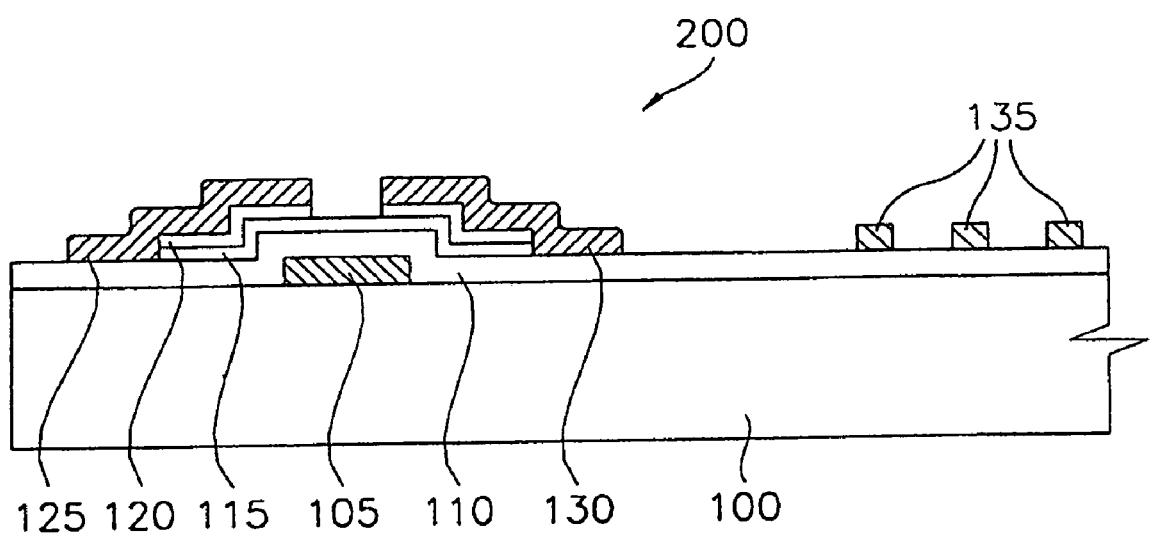
FIGS. 12A to 12C are sectional views illustrating a method of fabricating the reflective type LCD of FIG. 9.
Figure 12B:
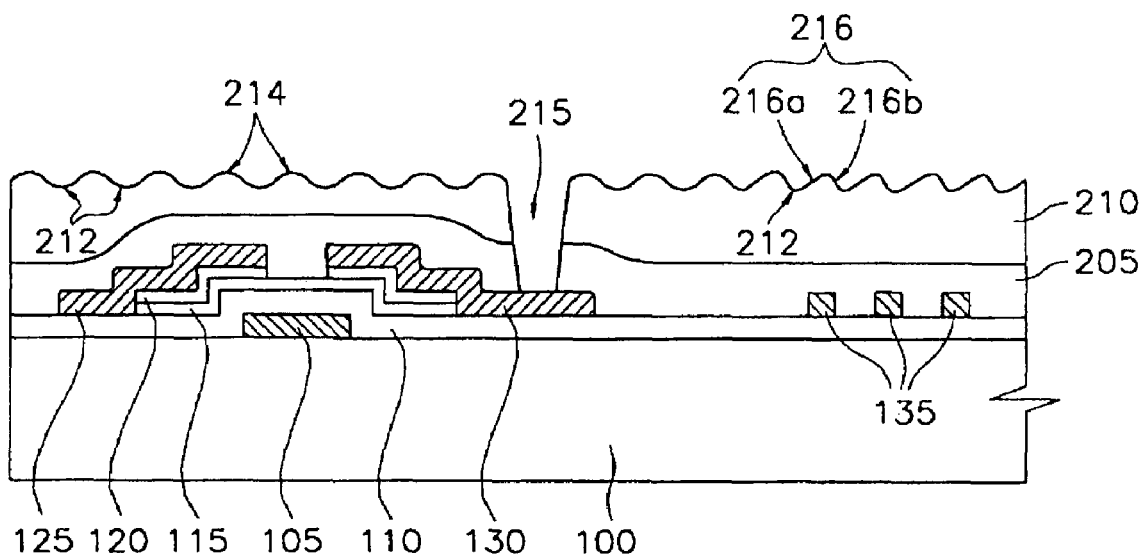
Figure 12C:
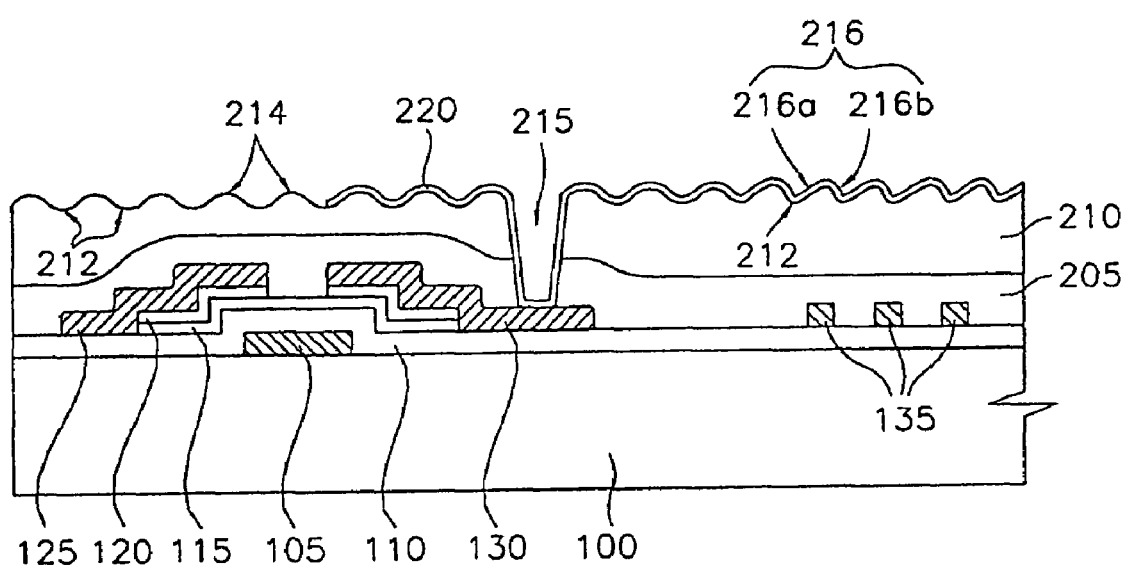

FIGS. 12A to 12C are sectional views illustrating a method of fabricating the reflective type LCD of FIG. 9.

Referring to FIG. 12A, on a first insulating substrate 100 made of insulating material such as glass or ceramic is deposited a first metal layer made of such as about 500 Å thickness chrome ("Cr") and about 2500 Å thickness aluminum-neodymium ("Al—Nd"). Thereafter, the deposited metal layer is patterned to form a gate wiring having a gate line (not shown) elongated in a first direction, a gate electrode 105 branched from the gate line and a gate pad (not shown). The gate pad is connected to an end of the gate line, receives an external signal, and transmits the received signal to the gate line.

Afterwards, a gate insulating film 110 made of about 4500 Å thickness silicon nitride, an active pattern 115 made of about 2000 Å thickness amorphous silicon and an ohmic contact layer 120 made of $n^+$ doped amorphous silicon with about 500 Å thickness are formed sequentially on the first insulating substrate 100 on which the gate wiring is formed.

Subsequently, on the first insulating substrate 100 on which resultant substances are formed is deposited a second metal layer of metal such as, for example, chromium ("Cr"), chromium-aluminum ("Cr—Al") or chromium-aluminum-chromium ("Cr—Al—Cr") in a thickness of an about 1500 to about 4000 Å by a sputtering method. Then, the second metal layer is patterned to form data wiring including a data line (not shown) elongated in a second direction perpendicular to the gate line, a source electrode 125 branched from the data line, a drain electrode 130, and a data pad that is connected to an end of the data line and transmits image signals on the data line. At least one embossing regulation pattern 135 of the second metal layer is formed on a predetermined region of the first insulating substrate 100 so as to increase the reflection ratio and to guarantee angular field in a specific direction.

A portion of ohmic contact layer 120 between the source electrode 125 and the drain electrode 130 is removed by a Reactive Ion Etching ("RIE") method. Thus, the gate electrode 105, gate insulating film 110, active pattern 115, ohmic contact layer 120, source electrode 125 and drain electrode 130 are formed, thereby completing a TFT 200.

Referring to FIG. 12B, a transparent inorganic insulating film 205 made of such as silicon nitride is formed as a passivation layer on the entire surface of the first insulating substrate 100 on which the TFT 200 is formed. A first contact hole is formed by etching the inorganic insulating film 205 and the gate insulating layer 110 so as to partially expose the drain electrode 130 of the TFT 200. A photosensitive organic insulating layer 210 made of such as acrylic resin is coated in a thickness of about 3 to about 5 μm on the first contact hole and the inorganic insulating film 205 by a spin coating method or by a slit coating method.

Then, a soft-baking process is performed near the glass transition temperature, such as, for example, 90 degrees Celsius, for about 3 minutes so as to remove solvent.

On the organic insulating layer 210 are formed the contact hole 215 exposing the drain electrode 130 and a plurality of grooves and protruded portions through a UV exposure process and development process. A first photo mask having a pattern corresponding to the contact hole 215 is used to expose a portion of the organic insulating layer 210 over the drain electrode 130 through a first full exposure process. Then, a lens exposure process using the second photo mask 500 with micro lens patterns is performed to an exposure amount of about 2000 ms, thereby secondly exposing the organic insulating layer 210 except the contact hole 215.

A developing process is performed to thereby form a contact hole 215 exposing a portion of the drain electrode 130 and an embossing pattern having a plurality of first regions 212 and second regions 214, 216 on a surface of the organic insulating layer 210.

During the second exposure process, a second region 216 has an asymmetric profile. Namely, the second region 216 with the asymmetric profile includes a first portion having a gentle slope of profile 216a and a second portion having a steep slope of profile 216b. According to the present invention, another mask is not required so as to regulate the slope of the embossing pattern in a specific region because a metal layer of the data wiring is used to form the embossing regulation pattern 135.

After the developing process is completed, the organic insulating layer 210 is put through a hard-baking process in a furnace or oven at a temperature of about 100 to about 120 degrees Celsius for about 3 minutes so as to reflow the organic insulating layer 210, to outgas the organic insulating layer 210, and to remove solvent. The temperature is increased slowly to about 230 degrees Celsius for about 60 minutes, and then the temperature is maintained at about 230 degrees Celsius for about 40 minutes. Under this condition, the organic insulating layer is cured so as to harden and stabilize the organic insulating layer. The final thickness of the organic insulating layer 210 is about 2 to about 3 μm.

Referring to FIG. 12C, first, the gate insulating film 110 is put through a dry-etching process, although not shown in FIG. 12C, so as to form the contact holes to expose a gate pad and a data pad in a pad region. Afterwards, a third metal layer made of metal with a high reflection ratio, such as aluminum ("Al") or silver ("Ag"), is deposited on the organic insulating layer 210 and the contact hole 215. The third metal layer is patterned through a photolithography process to form a reflective electrode 220 used as a pixel electrode. The reflective electrode 220 is connected to the drain electrode 130 of the TFT 200 through the contact hole 215. A photoresist is coated on the reflective electrode 220, and a first orientation film 260 is formed through a rubbing process. The first orientation film 260 pre-tilts liquid crystal molecules of the liquid crystal layer 280 at a predetermined angle.

The reflective electrode 220 has the same shape as the surface of the organic insulating layer 210. The reflective electrode 220 has a plurality of first regions or grooves 212 and a plurality of second regions or protruded portions 214, 216 functioning as micro lenses in correspondence with the surface and the embossing pattern of the organic insulating layer 210. Accordingly, a specific portion of the reflection electrode 220 has an asymmetric lens, to thereby increase the reflection ratio and to guarantee an angular field in a specific direction.

A color filter 310, a common electrode 315 and a second orientation film 320 are formed sequentially on the second insulating substrate 305 comprised of the same material as the first insulating substrate 100, thereby completing a second substrate 300. The second substrate 300 is disposed to face the first substrate 250. Seal lines 270 of a spacer shape are interposed between the first substrate 250 and the second substrate 300 to thus form a certain space between the first substrate 250 and the second substrate 300. The liquid crystal layer 280 is filled in the space by a vacuum injection method, thereby completing a reflective type LCD according to the second embodiment of the present invention.

Figure 13:
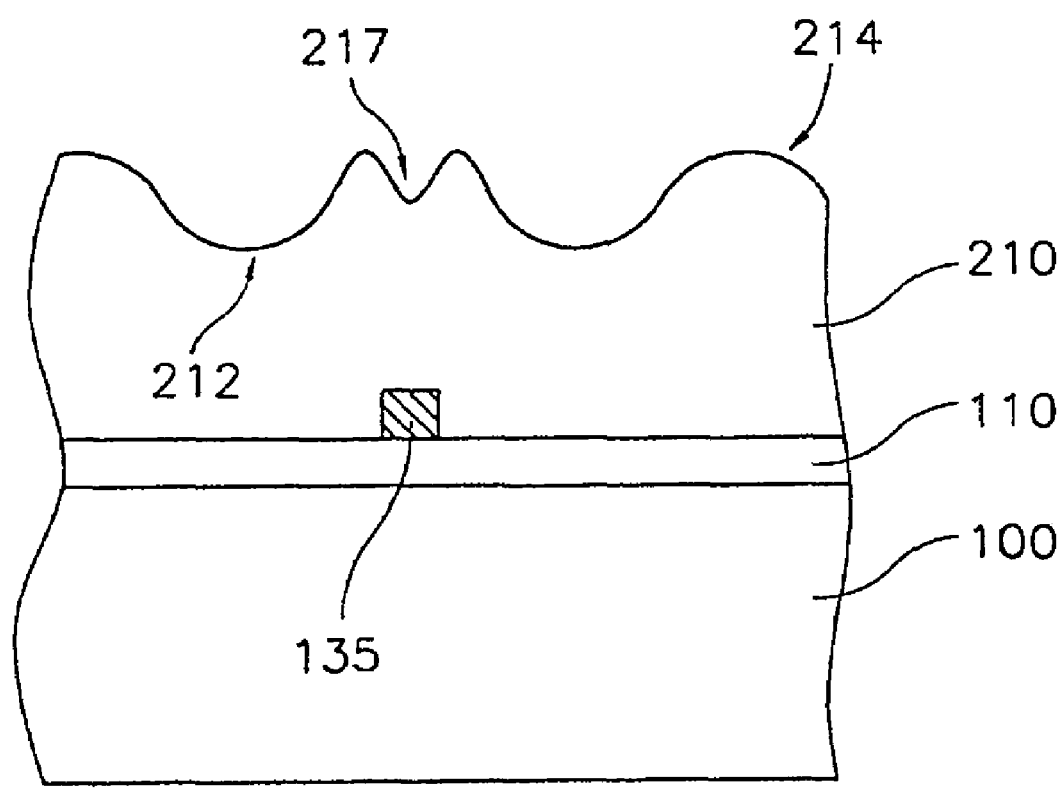
FIG. 13 is a sectional view illustrating a method of forming embossing patterns of the LCD in accordance with a third embodiment of the present invention.

FIG. 13 is a sectional view illustrating a method of forming embossing patterns of the LCD in accordance with a third embodiment of the present invention. The third embodiment of FIG. 13 is the same as the second embodiment except that the embossing regulation pattern 135 is formed under a peak of the protruded portion at a center of the second region 214 so as to form at least one groove 217 in the second region 214.

In addition, the embossing regulation pattern 135 can be formed under a groove at a first region 212 so as to deepen the depth of the first region 212. Thus, various shapes of embossing profiles can be formed by means of regulating the arrangement of the embossing regulation pattern 135.

Figure 14:
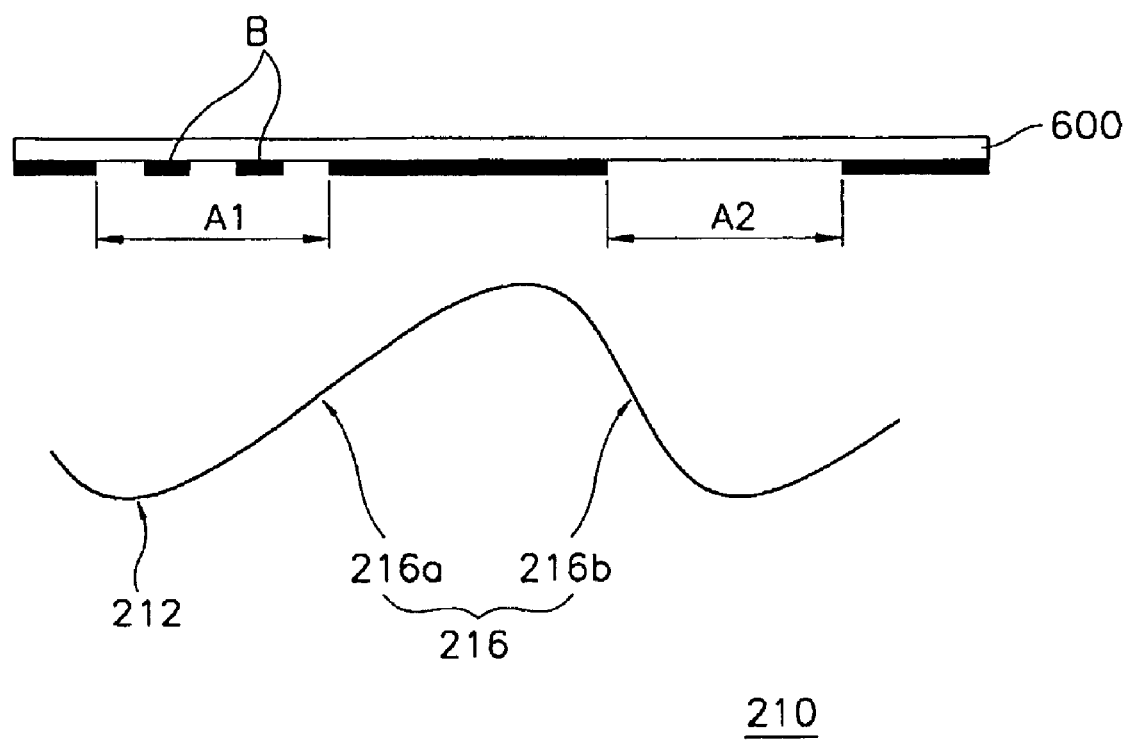
FIG. 14 is a sectional view illustrating a method of forming embossing patterns of the LCD in accordance with a fourth embodiment of the present invention.

FIG. 14 is a sectional view illustrating a method of forming embossing patterns of the LCD in accordance with a fourth embodiment of the present invention. Referring to FIG. 14, a TFT is formed by the same process as the second embodiment, and then an inorganic insulating layer and an organic insulating layer 210 is formed sequentially on the TFT and the first insulating substrate. The organic insulating layer 210 over the drain electrode of the TFT is exposed through a full exposure process by means of a photo mask with a pattern corresponding to a contact hole. Then, a portion of the organic insulating layer 210, except the portion of the organic insulating layer 210 corresponding to the contact hole, is exposed through a lens exposure process by means of a slit mask with a micro lens pattern.

At least one minute mask pattern ("B") is formed on a portion ("A1") of the slit mask 600 corresponding to the portion 216a having a gentle slope, so that a first region 212 of a groove shape is put through a full exposure process, a portion 216b of the second region 216 to have a steep slope is put through a normal exposure process and a portion 216a of the second region 216 to have a gentle slope is put through a slit exposure process. However, a minute mask pattern is not formed on a portion ("A2") of the slit mask 600 corresponding to the portion 216b having a steep slope.

The organic insulating layer 210 is exposed and developed by means of the slit mask 600 with the above structure. Thus, an embossing pattern is formed, which has a plurality of first regions and a plurality of second regions where the second regions have an asymmetric embossing profile.

FIGS. 15A and 15B are sectional views illustrating a method of fabricating the reflective and transmissive type LCD in accordance with a fifth embodiment of the present invention. Referring to FIG. 15A, an embossing pattern is formed on an organic insulating layer 210 by the same method as the second embodiment. The embossing pattern includes a plurality of first regions or grooves 212 having a recess shape lower in height relative to the second regions or protruded portions 214, 216, and a plurality of second regions 214, 216 having a protrusion shape higher in height relative to the first regions 212.

Specifically, on a first insulating substrate 100 is formed a TFT 200 including a gate electrode 105, a gate insulating film 110, an active pattern 115, an ohmic contact layer 120, a source electrode 125 and a drain electrode 130. At least one embossing regulation pattern 135 is formed so as to increase the reflection ratio and to guarantee the angular field in a specific direction when the source and drain electrodes, 125 and 130, respectively, are formed.

A transparent inorganic insulating film 205 made of such as silicon nitride is formed as a passivation layer on the entire surface of the first insulating substrate 100 on which the TFT 200 and the embossing regulation pattern 135 are formed. Afterwards, a first contact hole is formed by etching the inorganic insulating film 205 and the gate insulating layer 110 so as to partially expose the drain electrode 130 of the TFT 200. A photosensitive organic insulating layer 210 made of such as acrylic resin is formed on the first contact hole and the inorganic insulating film 205 by a spin coating method or by a slit coating method.

On the organic insulating layer 210 are formed the contact hole 215 exposing the drain electrode 130 and a plurality of grooves and protruded portions through an exposure process and a development process. A first photo mask having a pattern corresponding to the contact hole 215 is used to expose a portion of the organic insulating layer 210 over the drain electrode 130 through a first full exposure process. A portion of the organic insulating layer 210, except the contact hole 215, is subjected to a second exposure process at an exposure amount of about 2000 ms through a lens exposure process using the second photo mask 500 having a micro lens pattern. A developing process is performed to thereby form a contact hole 215 exposing a portion of the drain electrode 130 and an embossing pattern having a plurality of first regions 212 and second regions 214, 216 on a surface of the organic insulating layer 210. During the second exposure process, a second region 216 has an asymmetric profile. Namely, the second region 216 with the asymmetric profile includes a first portion having a gentle slope of profile 216a and a second portion having a steep slope of profile 216b. The gate insulating film 110 is put through a dry-etching process, although not shown in FIG. 15A, so as to form the contact holes to expose a gate pad and a data pad in a pad region.

Afterwards, a transparent conducting layer made of material such as indium-tin-oxide ("ITO") or indium-zinc-oxide ("IZO") is deposited on the organic insulating layer 210 and the contact hole 215. The transparent conducting layer is patterned through a photolithography process to form a transparent electrode 230 electrically connected to the drain electrode 130 through the contact hole 215.

Referring to FIG. 15B, a reflective conducting layer made of such as Al or Ag is deposited on the resultant substances of the organic insulating layer 210 on which the transparent electrode 230 is formed. The reflective conducting layer is patterned through the photolithography process to form a reflective electrode 220. A portion, on which the reflective electrode 220 remains, of the transparent electrode 230 becomes a reflection area, and another portion, on which the reflective electrode 220 is removed, of the transparent electrode 230 becomes a transmissive area.

The second substrate on which color filters are formed is combined with the first substrate on which the TFT and a multi-layer pixel electrode comprised of the transparent electrode and the reflective electrode are formed. Then, a liquid crystal layer is interposed between the first substrate and the second substrate, thereby completing a reflective and transmissive type LCD.

According to the fifth embodiment of the present invention, indoors or in a dark place where a sufficient external light source does not exist, the reflective and transmissive type LCD operates in a transmissive mode to display images by means of built-in light sources. Outdoors or in a place where a high illumination is provided, the reflective and transmissive type LCD operates in a reflective mode to display images by reflecting light incident from an external light source. Also, the asymmetric embossing pattern is formed without another mask, to thereby enhance the reflection ratio and to guarantee the angular field in a specific direction.

According to this embodiment of the present invention, the transparent electrode 230 is disposed under the reflective electrode 220 in the multi-layer pixel electrode comprised of the transparent electrode and the reflective electrode. However, in alternate embodiments, the transparent electrode 230 is disposed over the reflective electrode 220 in the multi-layer pixel electrode.

While the present invention has been described in detail, it shall be understood that various changes, substitutions and alterations can be made hereto without departing from the spirit and scope of the invention as defined by the appended claims.

What is claimed is:

1. A liquid crystal display device comprising:
    a first substrate on which a pixel array is formed;
    a second substrate facing the first substrate;
    a liquid crystal layer between the first and second substrates;
    an insulating layer formed on the first substrate, a plurality of first regions and a plurality of second regions being formed on a surface of the insulating layer, each of the second regions having a height difference relative to each of the first regions, a base line of each of the first regions forming an angle from about 5 degrees to about 15 degrees with respect to a tangent line of each of the second regions;
    a reflective electrode formed on the insulating layer, the reflective electrode having a surface structure conforming to the insulating layer; and
    an embossing regulation pattern formed under the insulating layer, a profile of the second region being formed asymmetrically by the embossing regulation pattern facing the second region so as to increase a reflection ratio in a specific direction.

2. The liquid crystal display device of claim 1, wherein each first tangent line of more than about 10 percent of the second regions forms an angle from about 8 degrees to about 11 degrees with respect to each base line of the first regions, and wherein each second tangent line of more than about 10 percent of the second regions forms an angle of more than about 11 degrees with respect to each base line of the first regions.

3. The liquid crystal display device of claim 1, wherein the embossing regulation pattern has an island shape.

4. The liquid crystal display device of claim 1, wherein the embossing regulation pattern is formed under the insulating layer to face the first region and the second region is adjacent to the first region.

5. The liquid crystal display device of claim 1, wherein each of the first regions has a groove shape lower than each of the second regions, and wherein each of the second regions has a protrusion shape higher than each of the first regions.

6. The liquid crystal display device of claim 5, wherein a groove of a first region having an embossing regulation pattern under the first region is deeper than a groove of a first region not having embossing regulation pattern under the first region.

7. The liquid crystal display device of claim 5, wherein at least one groove is formed on a second region by the embossing regulation pattern that is disposed under the second region.

8. The liquid crystal display device of claim 7, wherein at least one groove of the second region is higher than the groove of the first region.

9. The liquid crystal display device of claim 1, wherein the embossing regulation pattern comprises a reflective metal layer.

10. The liquid crystal display device of claim 1, wherein the pixel array includes a thin film transistor having a gate electrode, a gate insulating layer, an active layer, a source electrode and a drain electrode.

11. The liquid crystal display device of claim 1, wherein the embossing regulation pattern is formed from the same layer as the source and drain electrodes.

12. A method of fabricating a liquid crystal display device, the method comprising:
    forming a pixel array on a first substrate;
    forming an insulating layer on the first substrate;
    forming a plurality of first regions and a plurality of second regions at a surface of the insulating layer by exposing and developing the insulating layer so that each of the second regions has a height difference relative to each of the first regions, a base line of each of the first regions formed an angle from about 5 degrees to about 15 degrees with respect to a tangent line of each of the second regions by regulating an exposure amount;
    forming a reflective electrode having a surface structure conforming to the insulating layer;
    forming a second substrate to face the first substrate;
    forming a liquid crystal layer between the first and second substrates; and
    forming an asymmetric profile on a surface of the second region before forming the insulating layer by forming an embossing regulation pattern facing the second region to increase a reflection ratio in a specific direction.

13. The method of claim 12, wherein the embossing regulation pattern has an island shape.

14. The method of claim 12, wherein the embossing regulation pattern is formed under the insulating layer to face the first region and the second region is adjacent to the first region.

15. The method of claim 12, wherein a groove of a first region having an embossing regulation pattern under the first region is deeper than a groove of a first region not having an embossing regulation pattern under the first region.

16. The method of claim 12, wherein at least one groove is formed on a second region by the embossing regulation pattern that is disposed under the second region.

17. The method of claim 12, wherein the embossing regulation pattern comprises a reflective metal layer.

18. The method of claim 12, wherein the pixel array includes a thin film transistor having a gate electrode, a gate insulating layer, an active layer, a source electrode and a drain electrode.

19. The method of claim 18, wherein the embossing regulation pattern is formed from a same layer as in the source and drain electrodes.

* * * * *